(12) United States Patent
Ichikawa

(10) Patent No.: US 6,644,455 B2
(45) Date of Patent: Nov. 11, 2003

(54) RENTAL SYSTEM, MACHINE AND METHOD FOR PROVIDING RENTAL ITEMS

(75) Inventor: Kenzo Ichikawa, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 82 days.

(21) Appl. No.: 09/845,426

(22) Filed: Apr. 30, 2001

(65) Prior Publication Data

US 2001/0041987 A1 Nov. 15, 2001

(30) Foreign Application Priority Data

May 12, 2000 (JP) ........................................ 2000-140141

(51) Int. Cl.$^7$ ................................................ G07F 7/00
(52) U.S. Cl. ........................ 194/205; 194/210; 194/212; 194/213; 221/9; 700/231; 700/232; 700/236; 700/237
(58) Field of Search ................................ 194/205, 210, 194/212, 213, DIG. 906; 221/9; 700/231

(56) References Cited

U.S. PATENT DOCUMENTS

| | | | | |
|---|---|---|---|---|
| 4,412,292 A | * | 10/1983 | Sedam et al. ................ 221/9 |
| 4,458,802 A | * | 7/1984 | Maciver et al. .............. 186/56 |
| 4,803,348 A | * | 2/1989 | Lohrey et al. .............. 235/381 |
| 4,836,352 A | * | 6/1989 | Tateno et al. ............ 177/25.15 |
| 4,858,743 A | * | 8/1989 | Paraskevakos et al. ..... 194/205 |
| 4,860,876 A | * | 8/1989 | Moore et al. .............. 194/205 |
| 4,866,661 A | * | 9/1989 | de Prins ..................... 235/382 |
| 4,896,024 A | * | 1/1990 | Morello et al. ............. 194/210 |
| 4,997,076 A | * | 3/1991 | Hirschfeld et al. ......... 194/212 |
| 5,133,441 A | * | 7/1992 | Brown ....................... 194/211 |
| 5,934,439 A | * | 8/1999 | Kanoh et al. .............. 194/205 |
| 6,045,078 A | * | 4/2000 | Zander ..................... 242/332.1 |
| 6,109,524 A | * | 8/2000 | Kanoh et al. .............. 235/381 |
| 6,157,317 A | * | 12/2000 | Walker ....................... 340/7.1 |
| 6,161,059 A | * | 12/2000 | Tedesco et al. ............ 235/381 |
| 6,182,857 B1 | * | 2/2001 | Hamm et al. ................ 221/2 |
| 6,292,213 B1 | * | 9/2001 | Jones ......................... 348/61 |
| 6,317,049 B1 | * | 11/2001 | Toubia et al. ............ 340/573.4 |
| 6,339,745 B1 | * | 1/2002 | Novik ....................... 701/208 |
| 6,433,818 B1 | * | 8/2002 | Steinberg et al. ........... 348/161 |

FOREIGN PATENT DOCUMENTS

| | | | | |
|---|---|---|---|---|
| JP | 407141431 A | * | 6/1995 | ........... G06F/17/60 |
| JP | 11-271416 | | 10/1999 | |
| JP | 11345359 A | * | 12/1999 | ............. G07F/7/12 |

* cited by examiner

Primary Examiner—Donald P. Walsh
Assistant Examiner—Jeffrey Shapiro
(74) Attorney, Agent, or Firm—Frishauf, Holtz, Goodman & Chick, P.C.

(57) ABSTRACT

A rental system contains a plurality of rental digital cameras, and comprises a rental-item providing machine which provides users with digital cameras, respectively, and a management center which manages the digital cameras. The rental-item providing machine makes a credit inquiry about the users. The rental-item providing machine provides the users with the respective digital cameras, in accordance with a result of the credit inquiry. The rental-item providing machine sends identification information for identifying each of the contained digital cameras, to the management center. The management center manages the digital cameras, using the identification information sent from the rental-item providing machine.

6 Claims, 19 Drawing Sheets

RENTAL SYSTEM, MACHINE AND METHOD FOR PROVIDING RENTAL ITEMS

BACKGROUND OF THE INVENTION

1. Field of the Invention

The present invention relates to a system, machine and method for providing various rental items. The present invention also relates to a system, machine and method for providing rental digital cameras and providing printed images.

2. Description of the Related Art

In recent years, various electronic units, such as digital cameras, video cameras, car navigation systems, etc. are used outdoors.

For example, digital cameras are in wide use, because of their function that users can easily print images at home with the utilization of a computer and printer, etc.

Those users who do not possess a computer, etc. need to record image data on a recording medium, such as a flash memory card, floppy disk, or the like, and to go ask a photo shop for printing photographed images. Hence, it is quite time consuming to finally get the printed images.

Further, those users who do not possess a digital camera or leave their digital camera at home, they can not use the digital camera anyhow or outside their house. It is therefore demanded that digital cameras should be rented at places, such as amusement parks, golf course, theme parks, etc., where people frequently use the digital camera.

It is also demanded that a system for easily providing various rental items other than electronic units, such as digital cameras, etc., should be realized.

SUMMARY OF THE INVENTION

It is accordingly an object of the present invention to provide a system and machine for providing rental items.

Another object thereof is to provide a method for providing rental items.

Still another object thereof is to provide a system and machine for providing rental video cameras and providing printed images.

In order to accomplish the above objects, according to the first aspect of the present invention, there is provided a rental system comprising: a rental-item providing machine which contains at least one rental item, and provides the at least one rental item to a user; and a management device which manages the at least one rental item, and wherein the rental-item providing machine includes a container which contains the at least one rental item, an identification section which is installed in the container and identifies the at least one rental item contained inside the container, a first transmitter which transmits identification information representing the at least one rental item identified by the identification section to the management device, and the management device manages the at least one rental item, using the identification information sent from the first transmitter.

If the above-structured rental-item providing machine is arranged outdoors, the user can use the rental item, even if he/she does not possess such an item or leaves the item at home.

The rental-item providing machine may include: a first determiner which makes a credit inquiry about the user, thereby to determine whether to rent the at least one rental item to the user; and an opener which provides the user with the at least one rental item by opening the container, in a case where the first determiner determines to rent the at least one rental item to the user.

The management device may include a fifth determiner which determines whether to add a user in a user registration list, by making a credit inquiry about the user, and a register which registers the user in the user registration list, in a case where the fifth determiner determines to add the user in the user registration list; and the rental-item providing machine includes a sixth determiner which determines whether the register registers the user to be provided with the at least one rental item in the user registration list, and an opener which opens the container so as to provide the at least one rental item to the user, in a case where the sixth determiner determines that the register registers the user.

The rental-item providing machine may include: a memory which stores rental information representing the at least one rental item rented to the user and the user in association with each other; a second determiner which determines whether the at least one rental item rented to a user is same as a rental item returned by the user, based on the rental information stored in the memory; and a requesting device which requests the user to return the rented at least one rental item, in a case where the second determiner determines that the returned rental item is not the same as the at least one rental item rented to the user.

The rental system may further comprise an inquiry center which makes a credit inquiry about a user, and wherein the first determiner may include a card reader which reads out personal information of the user from a card possessed by the user, and a second transmitter which sends the personal information read by the card reader to the inquiry center, thereby to make a credit inquiry about the user.

The management device may include a position detector which detects a position of the at least one rental item rented to the user.

The management device may include: a third determiner which determines whether the at least one rental item is position outside a predetermined area, based on a detection result of the position detector; and a warning transmitter which transmits a warning toward the user to which the at least one rental item is rented, in a case where the third determiner determines that the at least one rental item is positioned outside the predetermined area.

The at least one rental item may be a digital camera; and the rental-item providing machine may include a printer which prints an image photographed by the digital camera.

The digital camera may include a third transmitter which sends image data representing the photographed image; the rental-item providing machine may include a first receiver which receives the image data sent by the third transmitter; and the printer may print an image, using the image data received by the first receiver.

The digital camera may be connectable to a cellular phone; and the third transmitter may transmit image data through the cellular phone connected to the digital camera.

The rental-item providing machine may include a plurality of rental-item providing machines within a predetermined area, and the management device may include a position detector which detects a position of the at least one rental item which is rented to a user, a fourth determiner which determines the rental-item providing machine to which the user returns the digital camera, based on a detection result of the position detector, and a controller which controls the rental-item providing machine, which is one determined by the fourth determiner, to prepare for printing an image photographed by the digital camera.

In order to achieve the above objects, according to the second aspect of the present invention, there is provided a rental-item providing machine comprising: a container which contains at least one rental item; a first determiner which determines whether to provide a user with the at least one rental item, by making a credit inquiry about the user; and an opener which opens the container so as to provide the user with the at least one rental item, in a case where the first determiner determines to provide the user with the at least one rental item.

The rental-item providing machine may further comprise: a memory which stores rental information representing a user and a rental item rented to the user in association with each other; a second determiner which determines, based on the rental information stored in the memory, whether a rental item returned by a user is same as a rental item rented to the user; and a requester which requests the user to return the rented rental item, in a case where the second determiner determines that the returned rental item is not same as the rental item rented to the user.

The first determiner may include: a card reader which reads out personal information of the user from a card which is held by the user; and a first transmitter which transmits the personal information read out by the card reader to a predetermined credit inquiry center, thereby to make a credit inquiry about the user.

The rental-item providing machine may further comprise a checker which checks a fundamental function of the returned rental item.

The rental item may be a digital camera; and the rental-item providing machine may further include a printer which prints an image photographed by the digital camera.

The digital camera may include a second transmitter which transmits image data of the photographed image; the rental-item providing machine may include a receiver which receives the image data transmitted by the second transmitter; and the printer may print an image using the image data received by the receiver.

In order to achieve the above objects, according to the third aspect of the present invention, there is provided a method for providing a rental item, comprising the steps of: determining whether to provide a user with a rental item, by making a credit inquiry about the user to which the rental item is rented; and providing the user with the rental item, by opening a container which contains the rental item, in a case where it is determined to provide the user with the rental item.

The method may further comprise the steps of: storing rental information representing a user and a rental item rented to the user in association with each other; determining, based on the rental information, whether a rental item returned by a user is same as a rental item rented to the user; and requesting the user to return the rented rental item, in a case where it is determined that the returned rental item is not same as the rented rental item.

In order to achieve the above objects, according to the fourth aspect of the present invention, there is provided a rental system comprising: a management device which is used by an operator, and determines whether to provide a user with a rental item; and an inquiry center which makes a credit inquiry about a user who intends to rent a rental item, and wherein the management device includes a card reader which reads out personal information of the user from a card which is held by the user, a first transmitter which transmits the personal information read out by the card reader to the inquiry center, thereby to make a credit inquiry about the user, a determiner which determines whether to provide the user with the rental item, in accordance with a result of the credit inquiry made by the first transmitter, and an instructor which instructs the operator to provide the user with the rental item, in a case where the determiner determined to provide the user with the rental item.

The rental item may be a digital camera; and the management device may include a printer which prints an image photographed by the digital camera.

The digital camera may include a second transmitter which transmits image data of the photographed image; the management device may include a receiver which receives the image data transmitted by the second transmitter; and the printer may print an image using the image data received by the receiver.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

A rental system according to the first embodiment of the present invention will now be described with reference to the accompany drawings.

The rental system is a system for providing items for rent to users at places, like an amusement park, theme park, and the like. In the first embodiment, explanations will be made to the rental system wherein the items for rent are digital cameras, for example.

Figure 1:
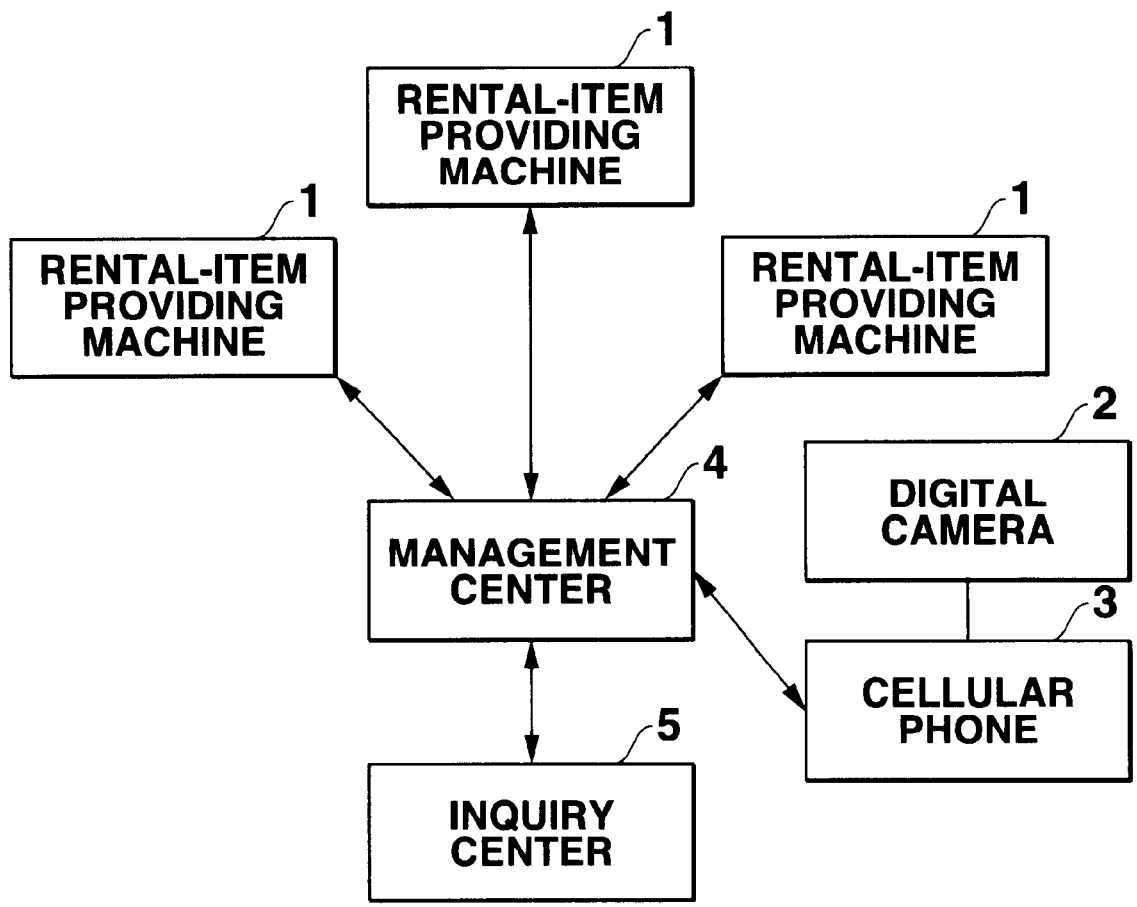
FIG. 1 is a diagram showing the structure of a rental system according to the first embodiment of the present invention.

As shown in FIG. 1, the rental system comprises a plurality of rental-item providing machines 1, a digital camera 2, a cellular phone 3, a management center 4, and an inquiry center 5.

The plurality of rental-item providing machines 1 are arranged within a predetermined area, and connected to the management center 4 through a private line or radio communications. In FIG. 1, three rental-item providing machines 1 are illustrated by way of example.

Each of the rental-item providing machines 1 contains a plurality of digital cameras for rent. The rental-item providing machine 1 reads out personal information (e.g. an ID number of each user, a card number of a card held by each user, etc.) of each user from a card held by the user. The rental-item providing machine 1 sends the read personal information to the management center 4, thereby to make a credit inquiry about the user to be provided with the digital camera for rent. The rental-item providing machine 1 provides the user with the digital camera 2 for rent, in accordance with an inquiry result sent from the management center 4. The card required for the credit inquiry is one for identifying the user, such as a dedicated prepaid-card, a debt card, a credit card, etc. The rental-item providing machine 1 stores image data representing an image photographed by the digital camera 2, prints the image when the digital camera 2 is returned back from the user, and provides the user with the printed image. The structure of the rental-item providing machine 1 will specifically be explained later.

The digital camera 2 photographs a target object in accordance with operations of the user. The digital camera 2 is connectable to the cellular phone 3. The photographed image data is sent to the management center 4 through the cellular phone 3. The structure of the digital camera 2 will specifically be described later.

The management center 4 sends the personal information of the user which is sent from the rental-item providing machine 1 to the inquiry center 5, which is managed by any financial institutions, thereby to make a credit inquiry of the user. The management center 4 sends an inquiry result sent from the inquiry center 5 to the rental-item providing machine 1. The management center 4 sends the image data given from the cellular phone 3 to each of the rental-item providing machines 1. The image data is stored in each of the rental-item providing machines 1, and printed at the time the digital camera 2 is returned back.

The structure of the rental-item providing machines 1 will now specifically be described.

Figure 2:
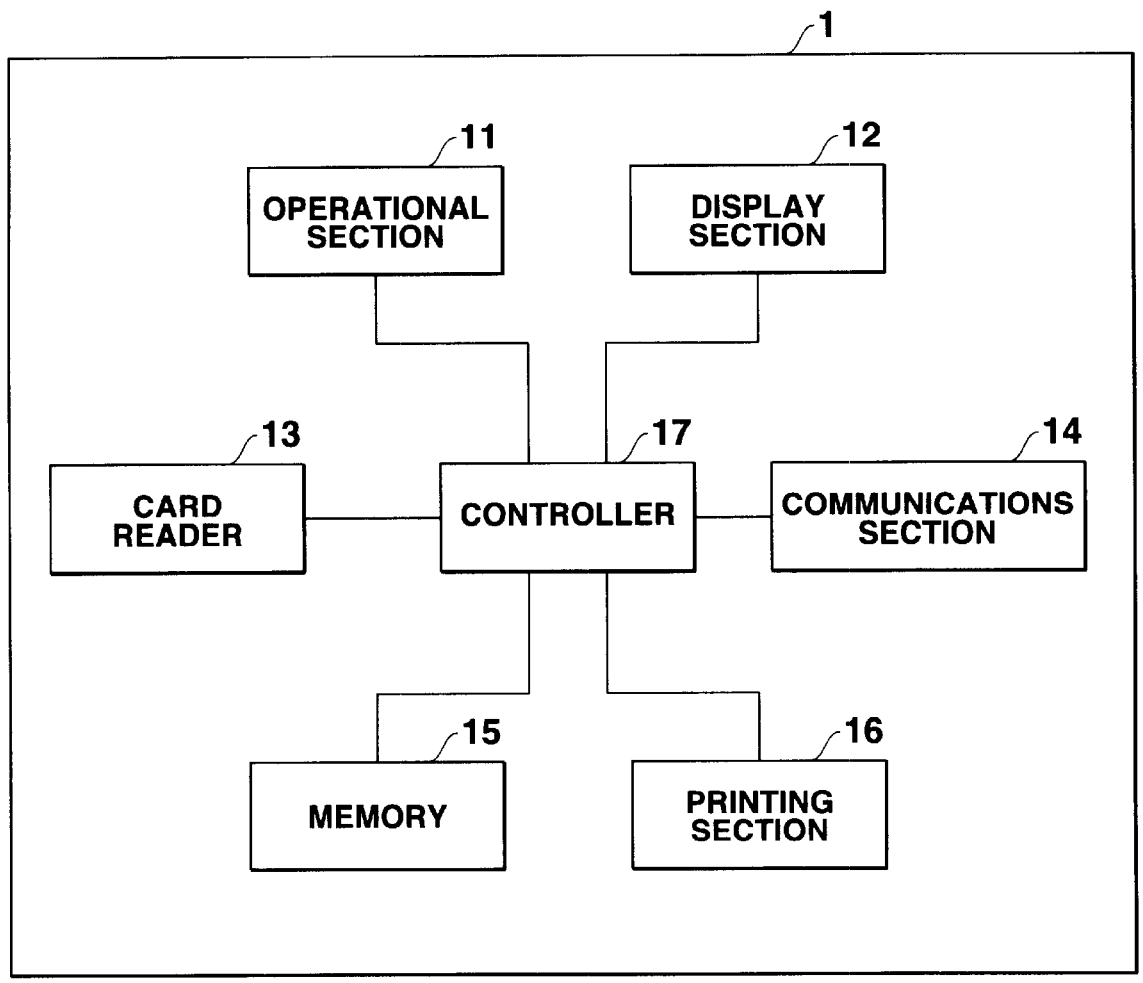
FIG. 2 is a diagram showing the structure of a rental-item providing machine included in the rental system of FIG. 1.
Figure 3:
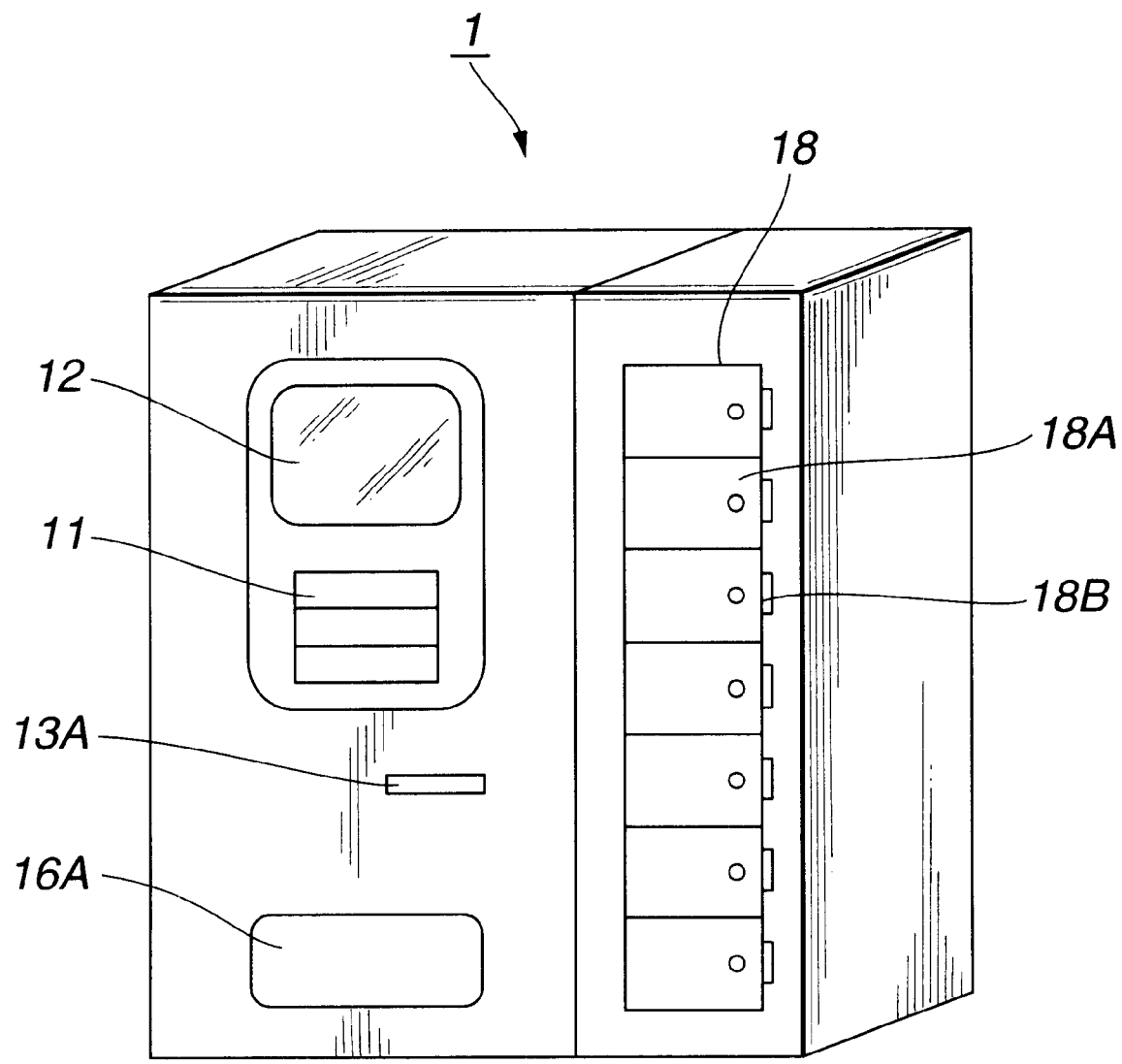
FIG. 3 is an outside perspective diagram showing the rental-item providing machine of FIG. 2.
Figure 4:
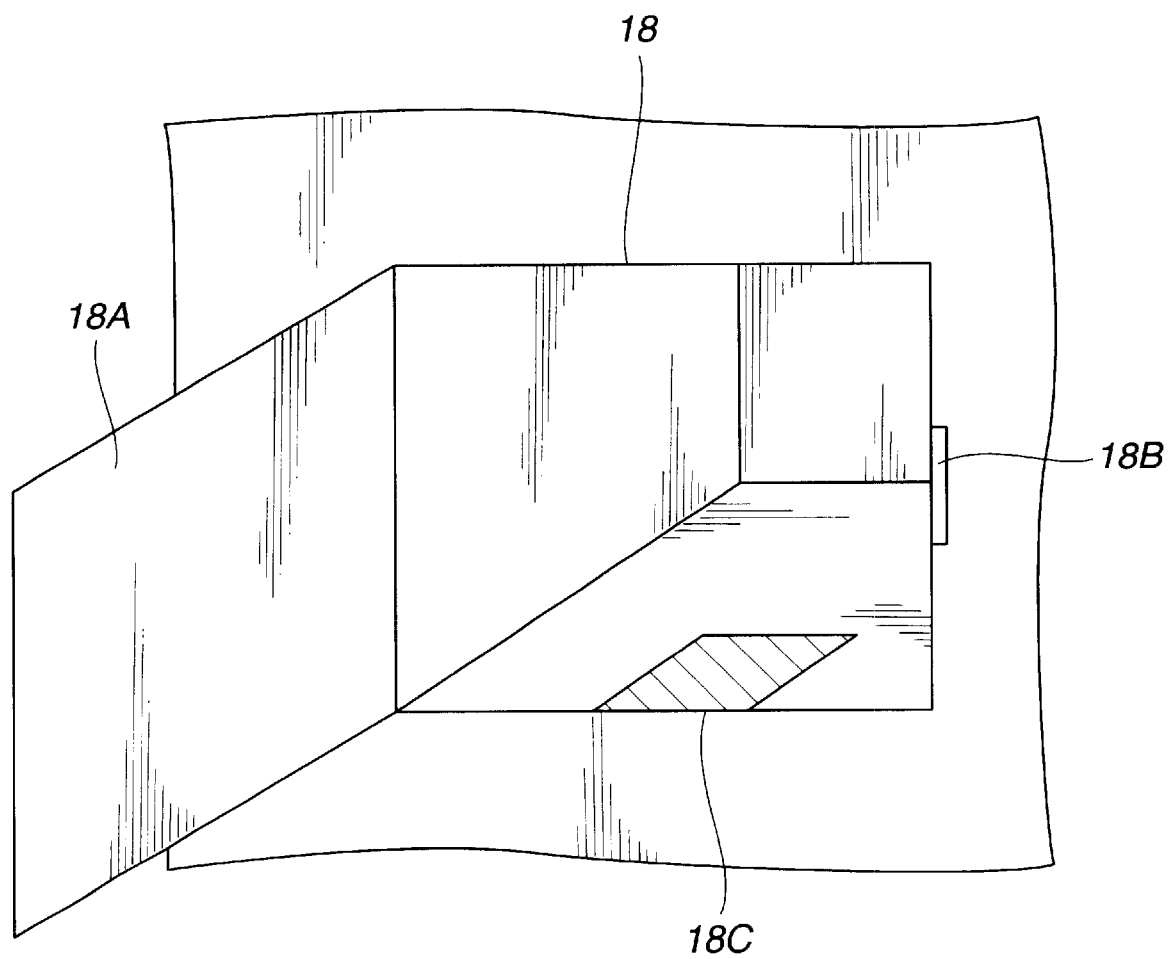
FIG. 4 is a diagram showing the structure of the inside of a box included in the rental-item providing machine of FIG. 3.

FIG. 2 is a diagram showing the structure of the rental-item providing machine 1. FIG. 3 is diagram showing the outward appearance of the rental-item providing machine 1.

As shown in FIG. 2, the rental-item providing machine 1 comprises an operational section 11, a display section 12, a card reader 13, a communications section 14, a memory 15, a printing section 16, and a controller 17.

The operational section 11 is composed of operational buttons, a touch panel, and the like, and operated by the user. The operational section 11 outputs, to the controller 17, a signal for instructing the controller 17 to begin a process for providing the rental digital camera 2 or a returning process, in accordance with user operations.

The display section 12 is composed of a CRT (Cathode Ray Tube), an LCD (Liquid Crystal Display) panel, an LED (Light Emitting Diode), etc. The display section 12 displays procedures for providing the digital camera 2 for rent, procedures for returning the digital camera 2 for rent, rental charges, and any other various messages.

The card reader 13 reads out personal information (an ID number of the user, a card number of a card held by the user) of the user from the user's card which is inserted from a card inserting section 13A prepared externally on the rental-item providing machine 1.

The communications section 14 is connected to the management center 4 through a dedicated line or radio communications. The communications section 14 sends the personal information of the user which is read by the card reader 13 to the management center 4. The communications section 14 receives an inquiry result of the user which is sent from the management center 4. The communications section 14 receives the image data sent from the management center 4.

The memory 15 includes a RAM (Random Access Memory), a ROM (Read Only Memory), etc., and stores a program and data for operating the rental-item providing machine 1. The memory 15 stores camera rental information representing a specific digital camera 2 rented to the user, and image data received by the communications section 14, etc.

The printing section 16 prints out an image, using the image data stored in the memory 15. The printed image is received by the user through an output section 16A prepared externally on the rental-item providing machine 1.

The controller 17 controls the operations of the above-described sections which are included in the rental-item providing machine 1, in accordance with the program and data stored in the memory 15. Operations of the controller 17 will specifically be described later.

As shown in FIG. 3, the rental-item providing machine 1 includes a plurality of boxes 18 containing the plurality of digital cameras, respectively. Each of the boxes 18 has a key 18B for locking a door 18A. The key 18B is controlled by the controller 17, so as to open or close the door 18A. Usually, each of the boxes 18 is locked out using the key 18B.

In a predetermined position inside each box 18, an infrared-ray detector as a camera identifier 18C which identifies the digital camera 2 is arranged, for example.

The digital camera 2 includes an infrared-ray transmitter (not illustrated). The infrared-ray detector receives an infrared-ray transmitted by the infrared-ray transmitter. Specifically, the digital cameras 2 are given management numbers, respectively. The infrared-ray transmitter transmits an infrared-ray signal representing the management number which is affixed to the digital camera 2 corresponding to the infrared-ray transmitter. The infrared-ray detector receives the infrared-ray signal transmitted by the infrared-ray transmitter, and outputs a camera identification signal indicating the management number represented by the infrared-ray signal to the controller 17. The controller 17 can determine which digital camera 2 is contained in each of the boxes 18, using the camera identification signal sent from the infrared-ray detector.

Each of the rental-item providing machines 1 and boxes 18 is also given a distinctive management number (a machine number and a box number). The management number of the digital camera 2 contained in a box 18, the box number of the box 18, and the machine number of the rental-item providing machine 1 correspond to each other, and are sent to the management center 4, as camera containing information. The camera rental information representing which user rents which digital camera 2 is also sent to the management center 4 by the controller 17. The management center 4 stores, as camera management information, the camera containing information and camera rental information, and manages the entire digital cameras 2 of the system.

The structure of each of the digital cameras 2 will now specifically be explained.

Figure 5:
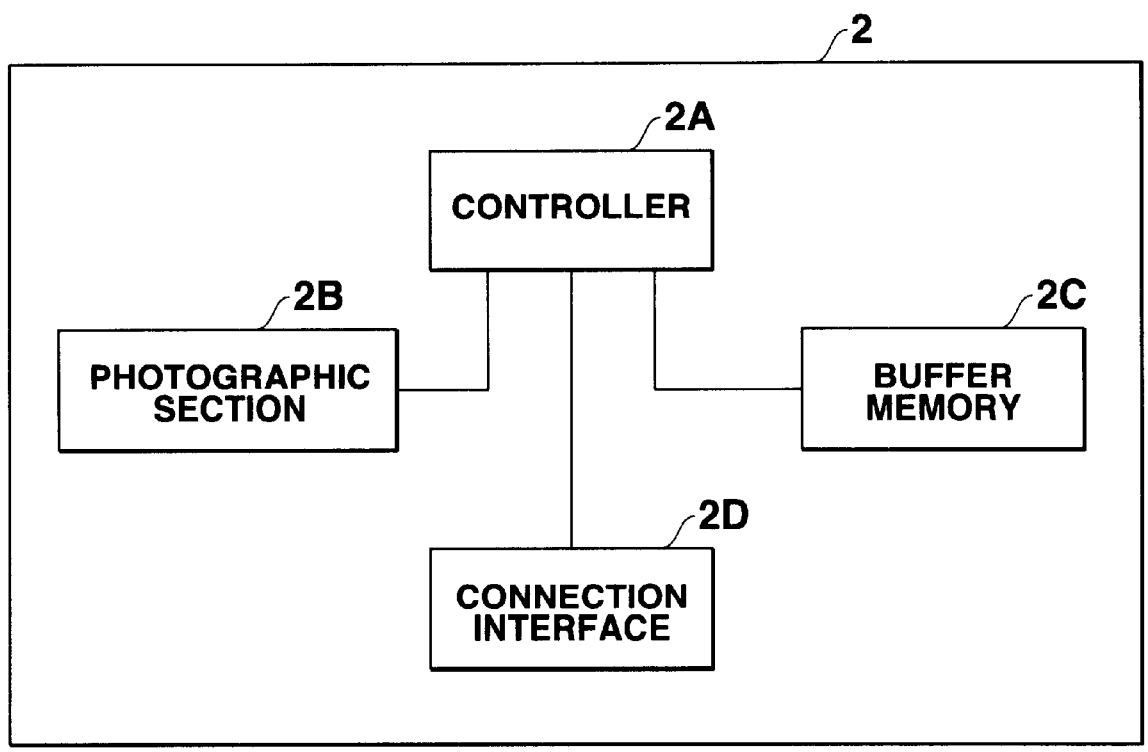
FIG. 5 is a diagram showing the structure of a digital camera included in the rental system of FIG. 1.

The digital camera 2 comprises, as shown in FIG. 5, a controller 2A, a photographic section 2B, a buffer memory 2C, and a connection interface 2D.

The controller 2A includes operation buttons, and controls the photographic section 2B, the buffer memory 2C, and the connection interface 2D, in accordance with operations of the user.

The photographic section 2B includes a CCD (Charge Coupled Device), and transmits data of an image to be photographed.

The buffer memory 2C stores the image data generated by the photographic section 2B. The buffer memory 2C stores the management number of the corresponding digital camera 2.

The connection interface 2D is connected to the cellular phone 3 through a dedicated cable or the like, and outputs the image data stored in the buffer memory 2C to the cellular phone 3.

Operations of the rental system having the above-described structure will now specifically be explained.

The user who intends to rent a digital camera 2 presses a predetermined operational button included in the operational section 11 of the rental-item providing machine 1. Upon pressing of the button, the operational section 11 outputs a rent signal for instructing the controller 17 to begin a process for providing the rental digital camera 2, to the controller 17.

Figure 6:
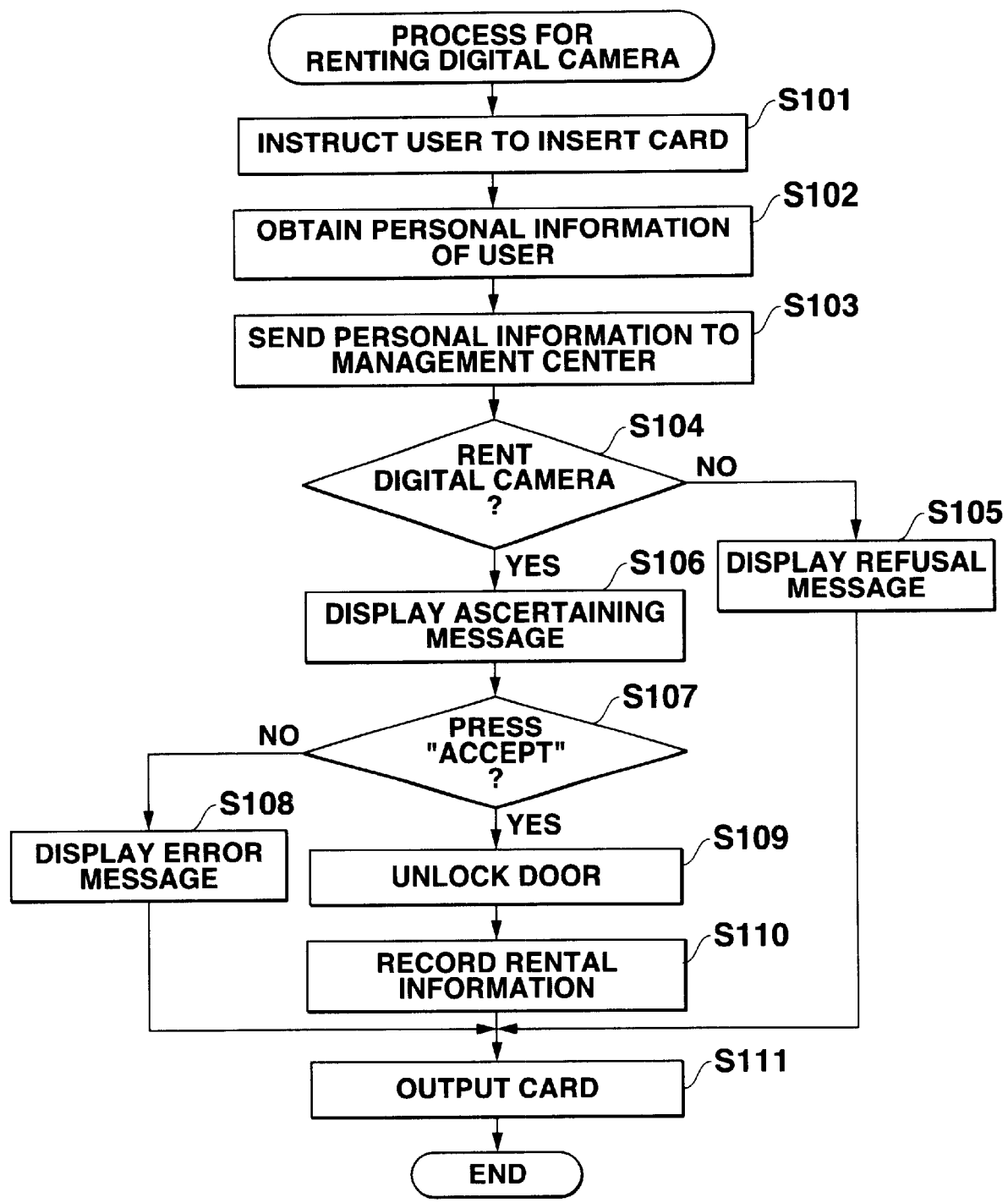
FIG. 6 is a flowchart for explaining a process for providing a rental digital camera, which is carried out by a controller included in the rental-item providing machine of FIG. 2.

In response to the rent signal sent from the operational section 11, the controller 17 begins the process for providing the rental digital camera 2 which is shown in FIG. 6, in accordance with the program and data stored in the memory 15.

The controller 17 instructs the user to insert a card in the rental-item providing machine (Step S101). Specifically, the controller 17 controls the display section 12 to display a message "Insert your card!", or the like.

After the user has inserted the card into the card inserting section 13A in accordance with the message displayed on the display section 12, the controller 17 controls the card reader 13 to read out personal information (the ID number of the user, the card number of the user's card, etc.) of the user from the card (Step S102).

The controller 17 stores the read personal information in the memory 15 and controls the communications section 14 for making a credit inquiry, so as to send the stored personal information to the management center 4 (Step S103).

The management center 4 sends the personal information sent from the rental-item providing machine 1 to the inquiry center 5.

The inquiry center 5 makes an inquiry about the user, using the personal information of the user which is sent from the management center 4. Specifically, the inquiry center 5 verifies the user's identity, the expiration date of validity of the card, and the like. In the case where the verification is completed, the inquiry center 5 sends an inquiry result reporting that the user is verified, to the management center 4. On the other hand, in the case where there is some kind of problem in verifying the user, such that the user's card is not valid, the inquiry center 5 sends an inquiry result reporting that the user can not satisfactorily be verified, to the management center 4.

The management center 4 forwards the inquiry result sent from inquiry center 5 to the rental-item providing machine 1.

The controller 17 of the rental-item providing machine 1 receives the inquiry result sent from the management center 4 through the communications section 14. The controller 17 discriminates whether the user has some kind of problem, using the received inquiry result. After this, the controller 17 determines whether to rent a digital camera 2 to the user (Step S104). Having performed the above procedures, it is preventable that the digital camera 2 is unintentionally rented to the user who has not been verified.

In the case where the controller 17 discriminates that the user has some kind of problem, i.e. determines that the digital camera 2 is not to be rented to the user (Step S104; NO), the controller 17 controls the display section 12 to display a refusal message, like "We're sorry, we can not accept your card" (Step S105), and the flow advances to step S111.

In the case where the controller 17 discriminates that the user has no problem, i.e. determines that the digital camera 2 is to be rented by the user (Step S104; YES), the controller 17 controls the display section 12 to show the terms of an agreement to the user. To discriminate whether the user has accepted the agreement, the controller 17 controls the display section 12 to display an ascertaining message, like "If you accept, press the button 'Accept'" (Step S106).

The controller 17 discriminates whether the user has pressed a predetermined button ('Accept') of the operational section 11 within a predetermined period, so as to discriminate whether the user has accepted the contents of the agreement (Step S107).

In the case where it is discriminated that the button 'Accept' has not pressed by the user within the predetermined period (Step S107; NO), the controller 17 controls the display section 12 to display an error message, like "It's passed a time limit, try the procedures again" (Step S108), and the flow advances to the step S111.

On the contrary, in the case where it is discriminated that the button 'Accept' has pressed within the predetermined period (Step S107; YES), the controller 17 turns the key 18B to unlock a predetermined one of the boxes 18 (Step S109). The key 18B to be turned is set in accordance with a preset rule.

The controller 17 stores, as camera rental information, the personal information stored in the memory 15, such as the ID number of the user, and the management number of the digital camera 2 which is contained inside the unlocked box 18, in association with each other, in the memory 15 (Step S110).

After this, the controller 17 outputs the card from the card inserting section 13A (Step S111), whereby the process for providing the rental digital camera 2 is completed.

As described above, the controller 17 controls the communications section 14, and sends the camera rental information which is created in the step S110 to the management center 4. The management center 4 stores the camera rental information sent from the rental-item providing machine 1, and manages the context of the rental digital cameras 2.

The user gets the digital camera 2 from the unlocked box 18, and can freely use the digital camera 2 within a predetermined area.

The controller 2A of the digital camera 2 controls the photographic section 2B to photograph an object, in accordance with the operations of the user. The controller 2A stores the photographed image data in the buffer memory 2C.

Every time the user has succeeded in taking a predetermined number of photographs, the user operates an operational button included in the controller 2A, and sends the image data stored in the buffer memory 2C to the management center 4, using the cellular phone 3. The image data to be sent to the management center 4 includes, for example, the management number of the digital camera 2, as identification information for identifying the digital camera 2 having photographed the image data.

The management center 4 sends the image data from the cellular phone 3 to the rental-item providing machine 1.

The controller 17 of the rental-item providing machine 1 stores the image data sent from the management center 4 through the communications section 14, in the memory 15. In this structure, the user does not bother about the capacity of the buffer memory 2C while taking the photographs.

Upon completion of taking the photographs, the user presses a predetermined operational button included in the operational section 11 of the rental-item providing machine 1, so as to return the digital camera 2. Then, the operational section 11 outputs a return-signal for instructing the controller 17 to start the process for returning the rental digital camera, to the controller 17.

Figure 7:
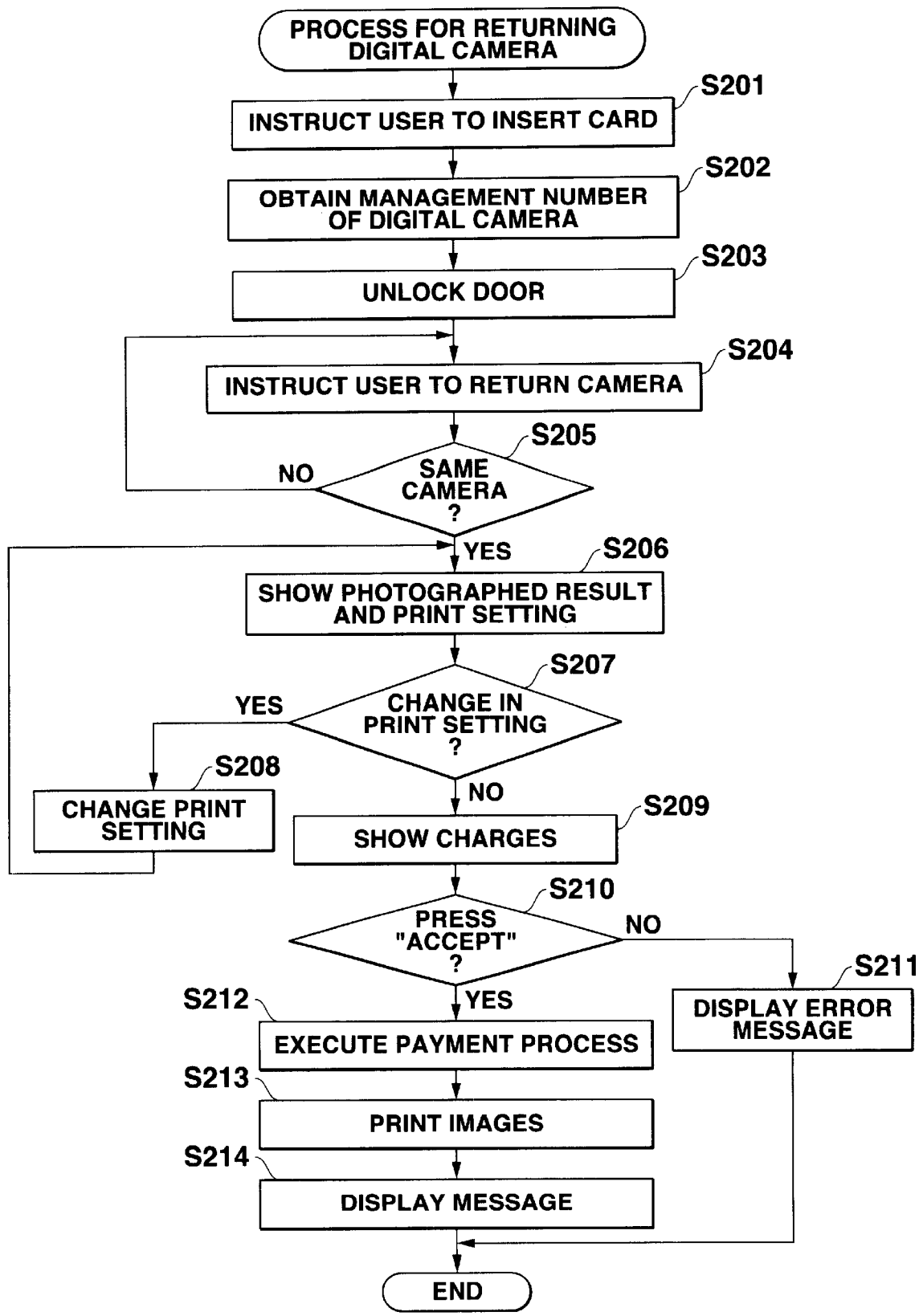
FIG. 7 is a flowchart for explaining a process for returning a digital camera, which is carried out by the controller included in the rental-item providing machine of FIG. 2.

In response to the return-signal sent from the operational section 11, the controller 17 begins the process for returning the digital camera, which is shown in FIG. 7, in accordance with the program and data stored in the memory 15.

The controller 17 instructs the user to insert the card (Step S201). Specifically, the controller 17 controls the display section 12 to display a message, like "Insert your card in the machine".

After the user inserts the card in the card inserting section 13A in accordance with the message displayed on the display section 12, the controller 17 controls the card reader 13, so as to read out the personal information of the user from the card. The controller 17 obtains the management number of the digital camera 2 which is rented to the user, from the camera rental information corresponding to the read personal information stored in the memory 15 (Step S202).

Subsequently, the controller 17 turns the key 18B to unlock the box 8 into which the digital camera 2 is returned (Step S203).

The controller 17 controls the display section 12 to display a message, like "Return the digital camera into the open box", so as to instruct the user to return the digital camera 2 (Step S204).

After the user puts the digital camera 2 in the box 18 in accordance with the message displayed on the display section 12, the controller 17 discriminates whether the returned digital camera 2 is the same as the one rented to the user (Step S205).

Specifically, as described above, the camera identifier 18C (the infrared-ray detector) set inside the box 18 receives the infrared-ray signal transmitted by the infrared-ray transmitter which is included in the digital camera 2. The infrared-ray detector outputs a camera identification signal representing the management number represented by the infrared-ray signal to the controller 17. Based on the camera identification signal sent from the infrared-ray detector, the controller 17 determines whether the digital camera 2 returned back into the box 18 is the one rented to the user.

In the case where it is determined that the digital camera 2 is not the one rented to the user (Step S205; NO), the controller 17 goes back to the step S204, wherein the controller 17 request the user for returning the rented digital camera 2.

On the contrary, in the case where it is determined that the digital camera 2 is the one rented to the user (Step S205; YES), the controller 17 locks the box 18 containing the returned digital camera 2, using the key 18B. Subsequently, the controller 17 obtains, from the memory 15, the image data having the management number of the returned digital camera 2, i.e. the image data photographed by the user. The controller 17 controls the display section 12, and shows a photographed result and print setting to the user (Step S206).

The photographed result represents, for example, the number of photographed images and a list of photographed images, etc. The print setting represents, for example, the number of printed images and printing methods for printing the photographed images. The printing methods include two printing methods, one for printing an image with a paid ad, and the other one for printing an image without a paid ad.

After this, the controller 17 controls the display section 12 to display a message, like "Press button 'Change', if you intend to change print setting, or press button 'OK', if you intend not to change print setting". Then, the controller 17 can discriminate whether the print setting should be changed (Step S207).

When the user intends to change the print setting, he/she presses a predetermined button ("Change") included in the operational section 11, and operates the operational section 11 so as to change the print setting.

When discriminated that the print setting is to be changed (Step S207; YES), the controller 17 changes the print setting in accordance with the operations of the user (Step S208). After this, the controller 17 returns to the step S206 to show the changed print setting to the user.

On the contrary, when discriminated that the print setting is not to be changed (Step S207; NO), the controller 17 controls the display section 12 to show charges to the user (Step S209).

The amount of money charged to the user is the total sum of the rental charges of the digital camera 2 and the printing charges of the photographed image(s).

The rental charges of the digital camera 2 are set in advance and calculated in time period unit or in day unit.

The printing charges of the photographed image varies according to the number of printed images and the selected printing method. For example, in the case where no image is printed, the money for the printing is not charged to the user. In the case where an image is printed with a paid ad, a discount amount of money which is obtained by subtracting the ad charges from a predetermined amount of money is charged to the user. In the case where images without any ad are printed, a predetermined amount of money without any discount is charged to the user.

After the charged amount of money is shown to the user, the controller 17 controls the display section 12 to display a message, like "If you accept the charged amount, press button 'Accept'". The controller 17 discriminates whether the user has pressed a predetermined button ("Accept") included in the operational section 11 within a predetermined period of time, thereby to determine whether the user has accepted the charged amount (Step S210).

When discriminated that the user has not pressed the button "Accept" within a predetermined period of time (Step S210; NO), the controller 17 controls the display section 12 to display an error message, like "Printing process stops by now" (Step S211), and the printing process is terminated.

On the contrary, in the case where it is discriminated that the button "Accept" has pressed within a predetermined period of time (Step S210; YES), the controller 17 executes a payment process with a card, based on the personal information of the user which is stored in the memory 15 (Step S212). The summed amount of money is firstly charged to a corresponding financial institution, and then the user pays the charged amount of money afterwards. Accordingly, the summed amount of money is charged to the user through the predetermined financial institution, thus achieving cashless payment.

The controller 17 controls the printing section 16 to print a photographed image(s). After this, the controller 17 outputs the card from the card inserting section 13A, and outputs the printed image to the output section 16A (Step S213). The user receives the printed image through the output section 16A.

The controller 17 controls the display section 12 to display a message, like "Thank you for using our service. We wait for the next opportunity" (Step S214), the process for returning the digital camera is completed.

Accordingly, the rental-camera providing machine 1 provides the user with the digital camera 2, and prints the photographed images. Hence, even if the user does not possess a digital camera or personal computer, he/she can use the digital camera 2 any time the user wishes so. Additionally, when the user has left his/her camera at home, the user can photograph any objects by having rented the digital camera 2.

The rental charges of the digital camera 2 and the printing charges of the printed images can be paid without the use of cash. Therefore, the user can reasonably and simply rent the digital camera 2.

Further, this rental system offers the benefit that the amount of money for the printing the photographed images is discounted in accordance with the printing method, it would be advantageous to the user.

Second Embodiment

A rental system according to the second embodiment of the present invention will now be explained with reference to the accompanying drawings.

Likewise the first embodiment, the rental system according to the second embodiment is used for providing users with rental items, at places, like an amusement park, theme park, and the like. In the second embodiment, as well, explanations will be made to the rental system wherein the items for rent are digital cameras, for example.

Figure 8:
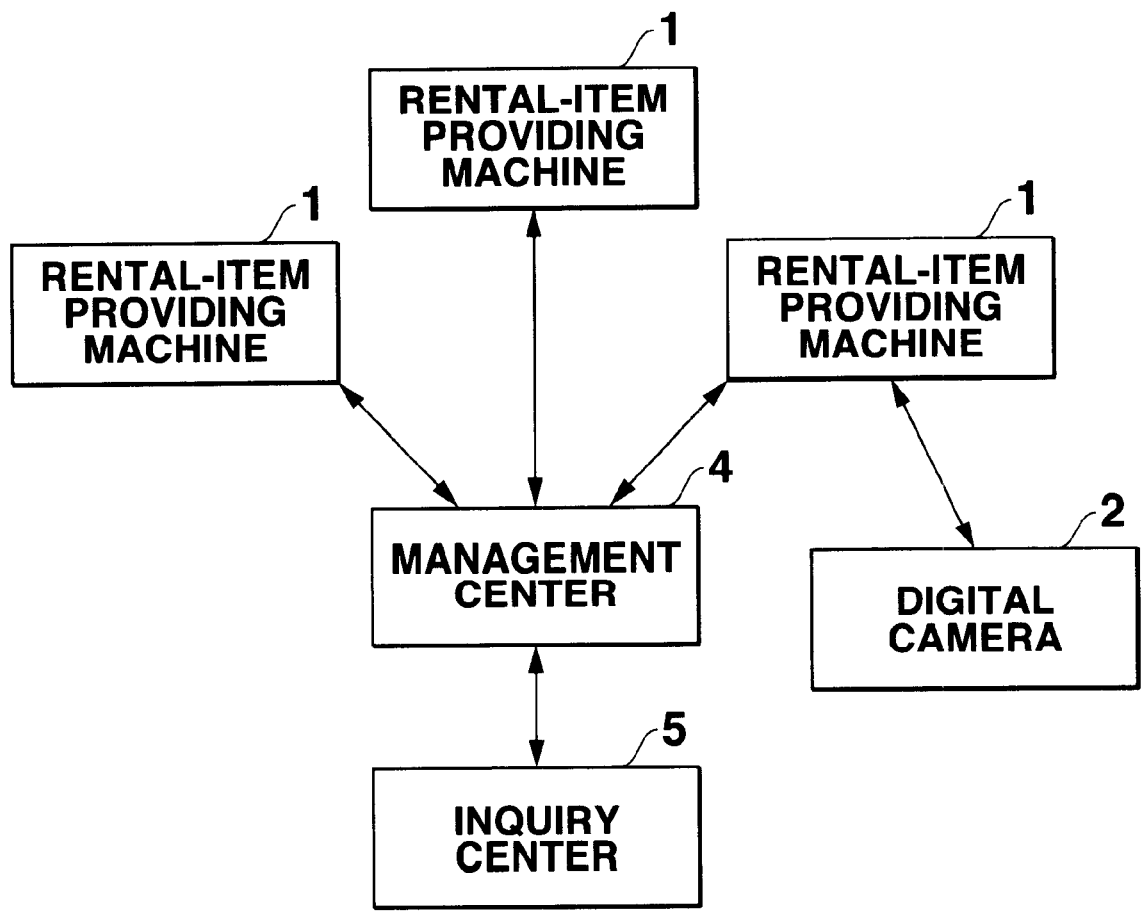
FIG. 8 is a diagram showing the structure of a rental system according to the second embodiment of the present invention.

The rental system of this embodiment comprises, as shown in FIG. 8, the plurality of rental-item providing machines 1, the digital cameras 2, the management center 4, the inquiry center 5. The cellular phone 3 included in the rental system of the first embodiment is not included in the rental system of the second embodiment.

Figure 9:
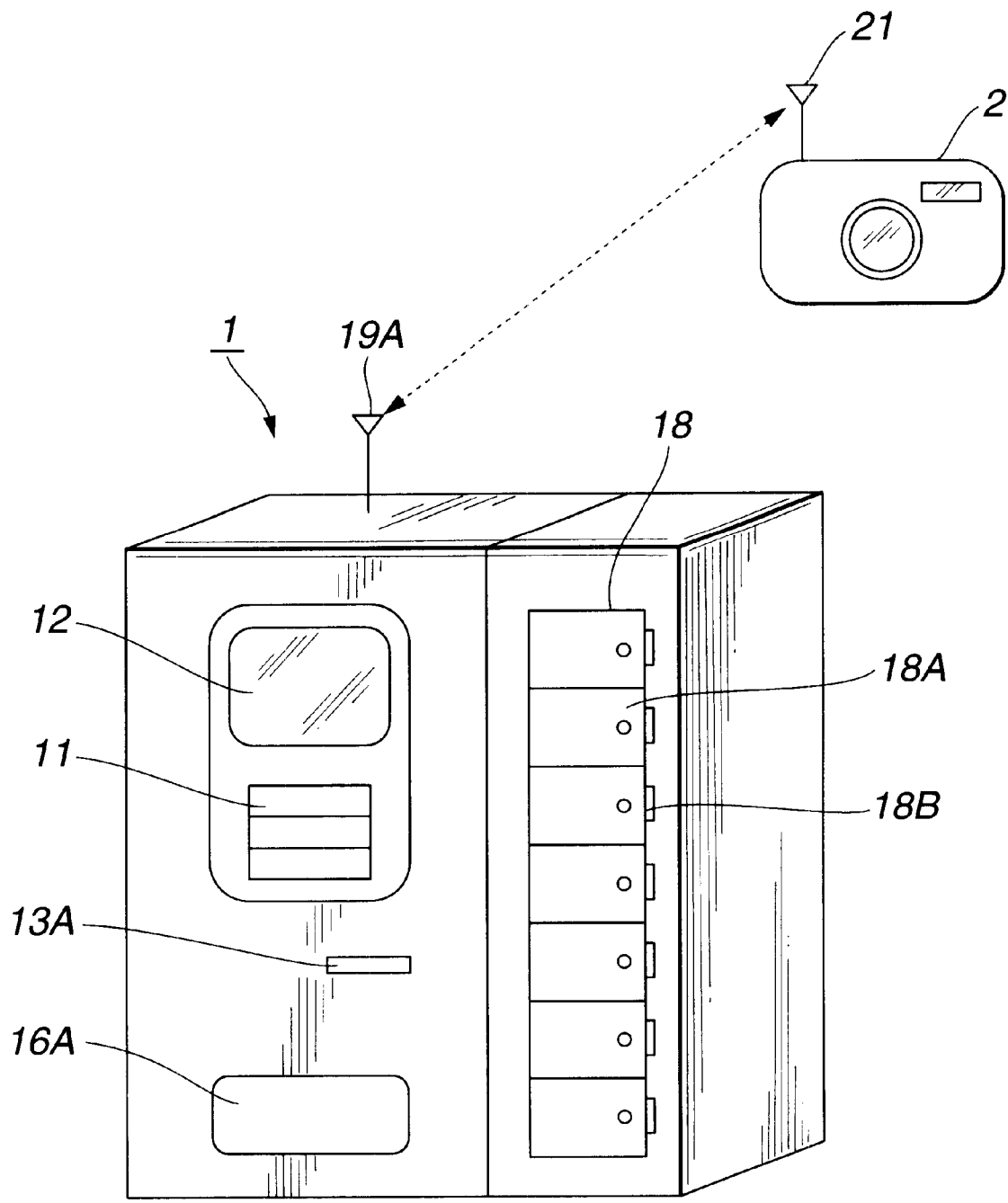
FIG. 9 is an outside perspective diagram showing a rental-item providing machine and digital camera included in the rental system of FIG. 8.

In the second embodiment, as seen from FIG. 9, an antenna 19A is installed in each of the rental-item providing machines 1, and an antenna 21 is installed in each of the digital cameras 2. The image data photographed using the digital camera 2 is sent to the rental-item providing machine 1 from the digital camera 2, through, for example, a communications network of a PHS (Personal Handyphone System).

Figure 10:
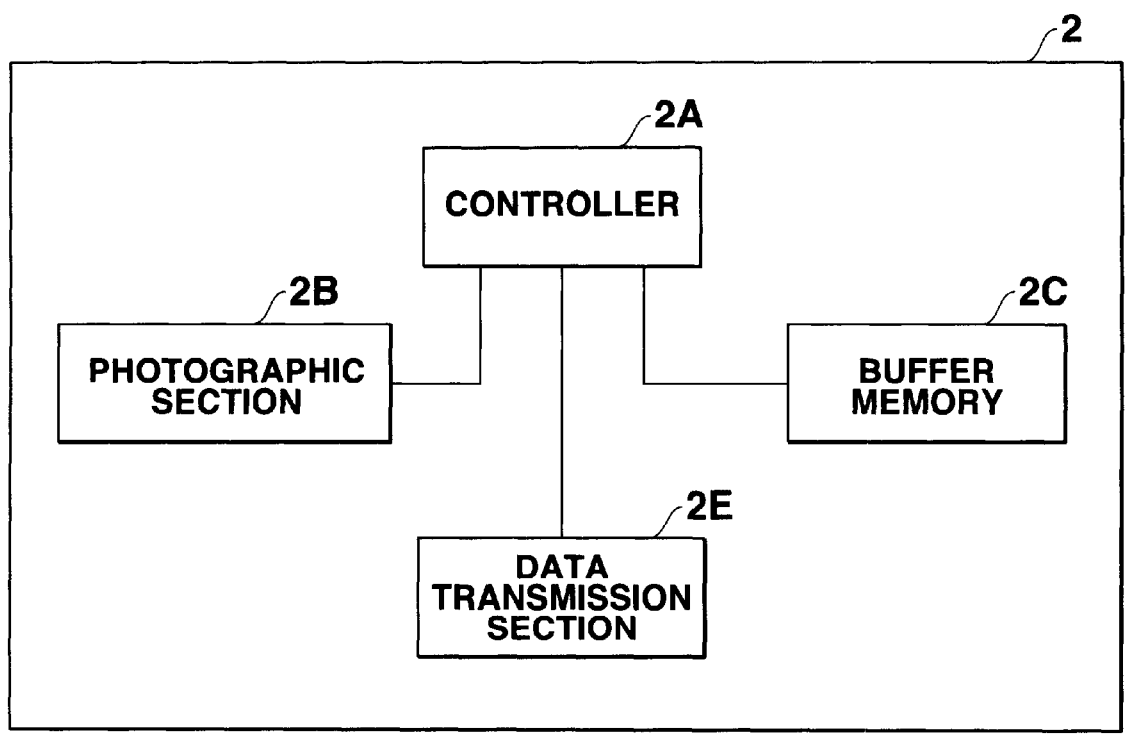
FIG. 10 is a diagram showing the structure of the digital camera shown in FIG. 9.

As shown in FIG. 10, the digital camera 2 includes a data transmission section 2E in place of the connection interface 2D of the digital camera 2 described in the first embodiment.

The data transmission section 2E includes an antenna 21, and sends image data and a photography-completion signal to the rental-item providing machine 1. Transmission of image data is performed, using a DPOF (Digital Printing Order Format) function which is included in the digital camera 2, for example.

The image data includes identification information and print setting information, etc. The identification information is, for example, the management number of the digital camera 2, and represents which one of digital cameras 2 has been used for photographing the image data. The print setting information represents the number of images to be printed and whether to insert a paid ad in each of the images to be printed.

The photography-completion signal represents that the photographing is completed. The photography-completion signal also includes the management number of the digital camera 2, as identification information for identifying the digital camera 2 having completed to photograph images.

Figure 11:
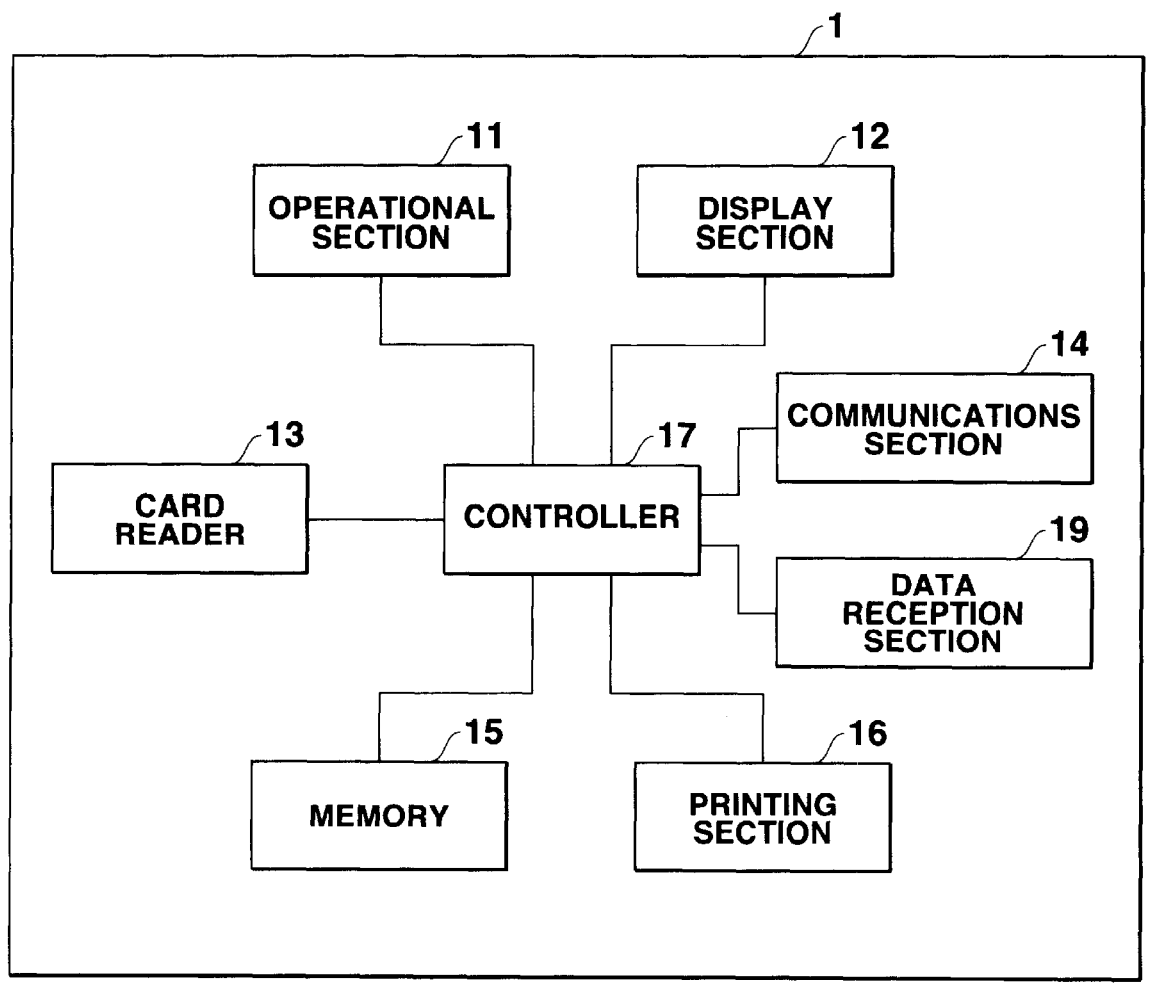
FIG. 11 is a diagram showing the structure of the rental-item providing machine shown in FIG. 9.

The rental-item providing machine 1 has, as shown in FIG. 11, a data reception section 19, in addition to the structure described in the first embodiment.

The data reception section 19 includes an antenna 19A, and receives the image data and photography-completion signal sent from the digital camera 2.

The controller 17 of the rental-item providing machine 1 stores the image data received by the data reception section 19 in the memory 15. In response to a photography-completion signal sent from the digital camera 2 through the data reception section 15, the controller 17 prints images, using the image data stored in the memory 15.

The structure of the rental system of this embodiment is substantially the same as that of the first embodiment, except the so-far described sections of the rental system.

Operations of the rental system having the above-described structure will now be explained.

In this embodiment, the operations wherein the rental-item providing machine 1 provides the user with the digital camera 2 are substantially the same as those described in the first embodiment.

The controller 2A of the digital camera 2 controls the photographic section 2B to photograph target images in accordance with the operations of the user. The user operates the operations buttons of the controller 2A, sets the number of photographed images to be printed, and determines whether to insert a paid ad in the printed image.

The controller 2A controls the data transmission section 2E in accordance with the operations of the user to send image data including the identification information and the print-setting information to the rental-item machine 1.

The controller 17 of the rental-item machine 1 receives the image data sent from the digital camera 2 through the data reception section 19, and stores the received image data in the memory 15.

When to stop taking photographs with using the digital camera 2, the user presses a predetermined operational button included in the controller 2A. Upon this, the controller 2A controls the data transmission section 2E, and sends the photography completion signal to the rental-item providing machine 1. As described above, the photography completion signal includes the identification information for identifying which one of the digital cameras 2 has sent the photography completion signal.

The controller 17 of the rental-item providing machine 1 prints images, in response to the photography completion signal sent from the digital camera 2 through the data reception section 19.

Specifically, the controller 17 obtains the identification information included in the photography completion signal. The controller 17 obtains the image data including the obtained identification information from the memory 15. Then, the controller 17 controls the printing section 16 to print images in accordance with the print-setting information included in the obtained image data. This enables images to be printed before the user returns the digital camera 2.

The user having completed the photographing of images intends to return the digital camera 2, so as to press a predetermined operational button included in the operational section 11 of the rental-item machine 1. Upon pressing the predetermined operational button, the operational section 11 outputs a return-signal for instructing the controller 17 to start the process for returning the digital camera 2, to the controller 17.

Figure 12:
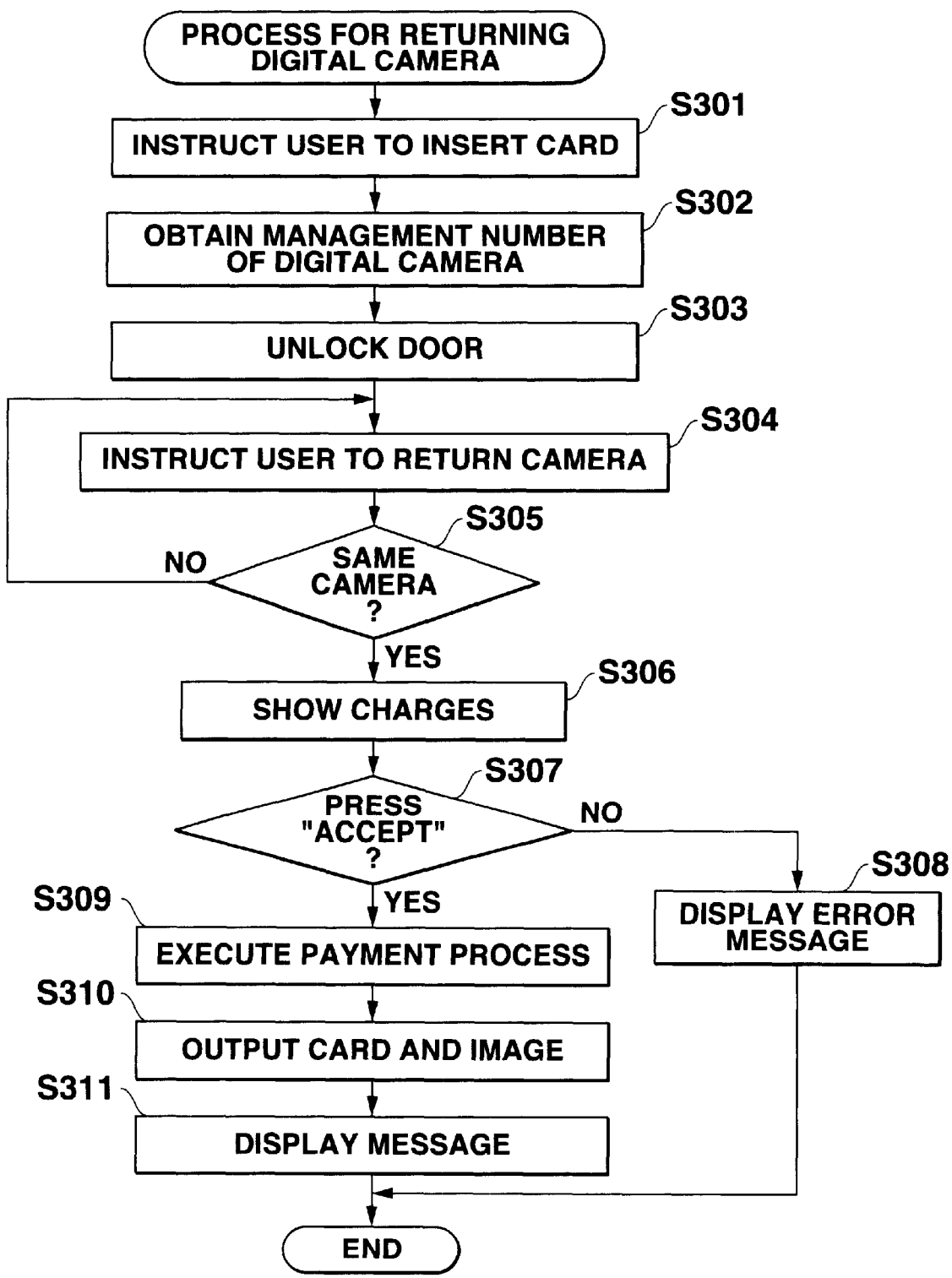
FIG. 12 is a flowchart for explaining a process for returning a digital camera, which is carried out by a controller included in the rental-item providing machine shown in FIG. 11.

In response to the return-signal sent from the operational section 11, the controller 17 begins the returning process shown in FIG. 12, in accordance with the program and data stored in the memory 15.

In the process for returning the digital camera, the first several procedures up to step S305, wherein the digital camera 2 returned back into the box 18 is determined whether to be the same as the one rented to the user, are substantially the same as those of the procedures up to the step S205 in the returning process shown in FIG. 7 in the first embodiment.

As described above, in the second embodiment, before returning back-the digital camera 2, the printing of photographed images is performed. Hence, after the controller 17 determines that the returned digital camera 2 is one rented to the user in the procedure of step S305, the controller 17 controls the display section 12 to show a message, like "Printing is done according to what you requested. Please pay the charges. Thank you.", together with the charges (Step S306).

After this, likewise the first embodiment, the controller 17 discriminates whether the user presses a predetermined button (Accept) of the operational section 11 within a predetermined period, thereby to determine whether the user has accepted to pay the charged amount of money (Step S307).

In the case where it is discriminated that the button "Accept" has not been pressed within a predetermined period (Step S307; NO), the controller 17 controls the display section 12 to display an error message, like "Try again" (Step S308), and the process for returning the digital camera 2 is terminated.

In the case where it is discriminated that the button "Accept" has been pressed within a predetermined period (Step S307; YES), the controller 17 executes a payment process with the personal information of the user which is stored in the memory 15, likewise the first embodiment (Step S309).

After this, the controller 17 outputs the card from the card inserting section 13A, and outputs the printed image through the output section 16A (Step S310).

The controller 17 controls the display section 12 to display a message, like "Thank you for using our service. We wait for the next opportunity." (Step S311), and the returning process is completed.

As described above, before returning the digital camera 2, the photographed image can be printed, so that the user can immediately receive the printed image without waiting for the printing of the image.

Third Embodiment

A rental system according to the third embodiment of the present invention will now be explained with reference to the accompany drawings.

The rental system according to the third embodiment is used for providing rental items to guests who stay at a hotel, motel, etc. In the third embodiment as well, explanations will be made to the rental system wherein the items for rent are digital cameras, for example.

Figure 13:
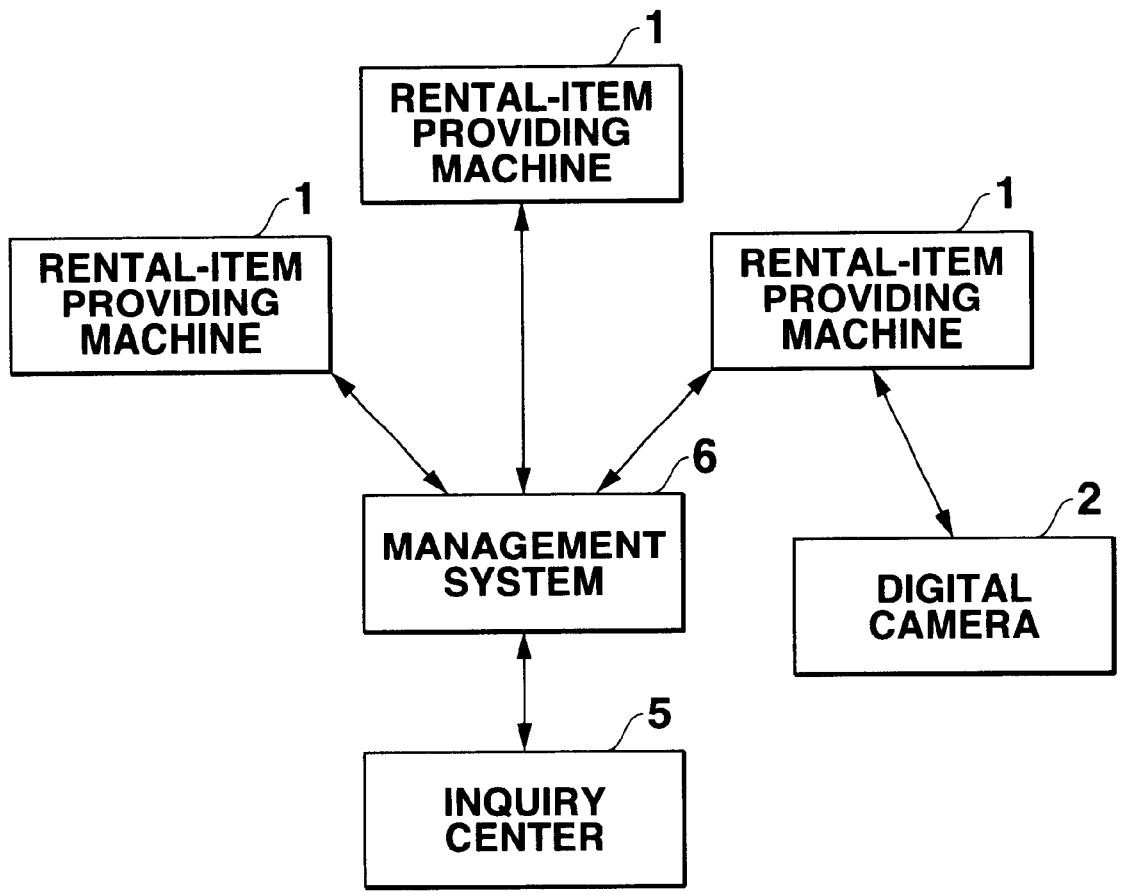
FIG. 13 is a diagram showing the structure of a rental system according to the third embodiment of the present invention.

The rental system according to the third embodiment comprises, as shown in FIG. 13, the plurality of rental-item providing machines 1, the digital camera 2, the inquiry center 5, and a management system 6.

Figure 14:
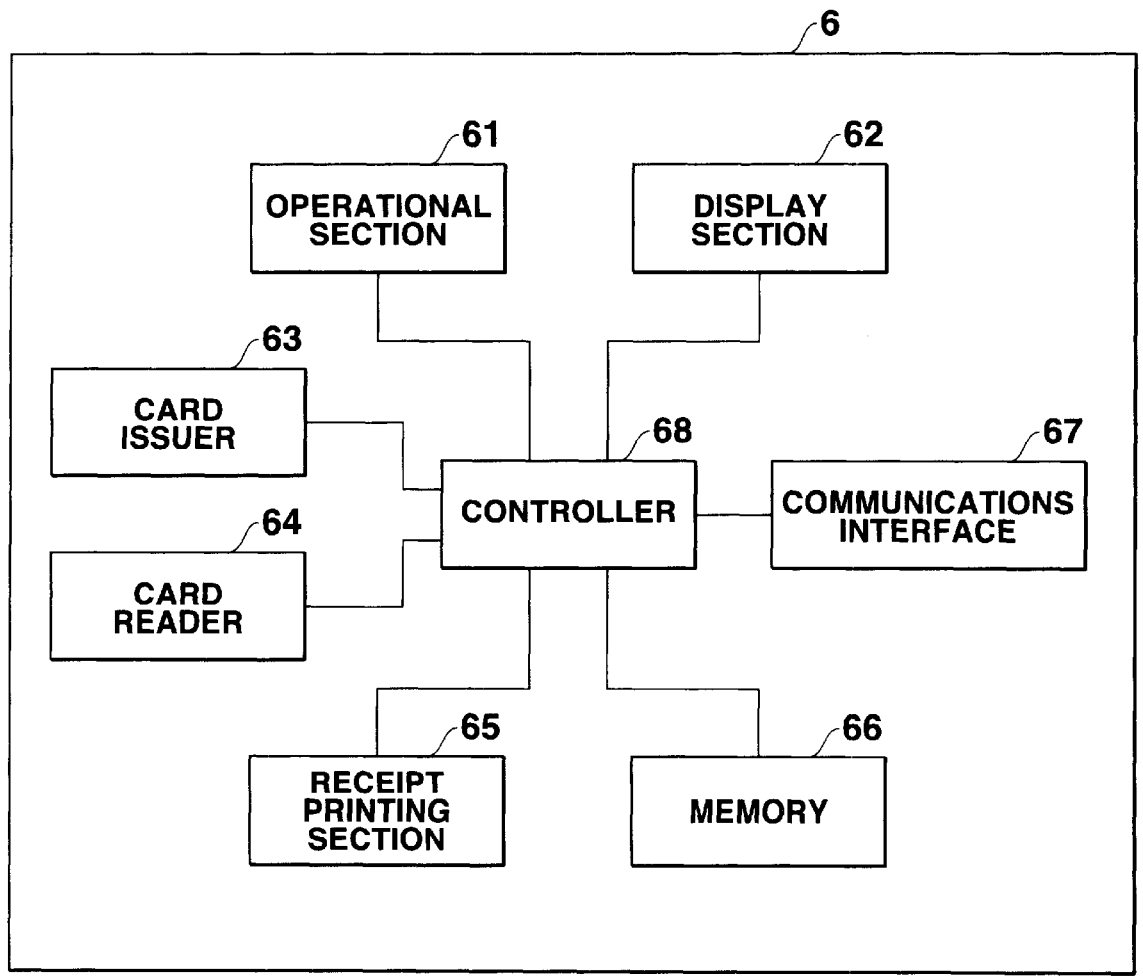
FIG. 14 is a diagram showing the structure of a management system included in the rental system shown in FIG. 13.

The management system 6 is installed in the reception of the hotel, etc. The management system comprises, as illustrated in FIG. 14, an input section 61, a display section 62, a card issuer 63, a card reader 64, a receipt printer 65, a memory 66, a communications interface 67, and a controller 68.

The input section 61 includes operational buttons, a touch panel, and the like, and operated by a guest (or an operator of the management system 6) at the checking-in/out time. The input section 61 outputs various signals for operating the management system 6, to the controller 68 in accordance with the operations of the guest.

The display section 62 includes an LCD panel, etc., and displays procedures for checking-in and checking-out.

The card issuer 63 issues an ID card, which can be computer-readable only within a predetermined area, for the guest. Record on the ID card is an ID number which is affixed to each hotel guest.

The card reader 64 reads out information recorded on a credit card held by the guest and on the ID card issued by the card issuer 63.

The receipt printer 65 prints a receipt which shows the charged amount paid by the guest at the time of checking-out.

The memory 66 stores a program and data for operating the management system 6. The memory 66 stores also guest information and charged information.

The guest information includes the ID number of the guest, checking-in time (date and time), residential address, name, age, sex, phone number, credit card company, and credit card number, and the like. The charged information is used for calculating the amount of money charged for the guest. For example, the charged information indicates services charges for services used by the guest.

The communications interface 67 is connected to the rental-item providing machines 1 through a communications network of the hotel. The communications interface 67 is connected to the inquiry center 5 through a public line, etc.

The controller 68 controls operations of the above-described sections included in the management system 6, in accordance with the program and data stored in the memory 66. Operations of the controller 68 will specifically be described later.

Any other sections of the structure of the rental system are substantially the same as those of the rental system according to the second embodiment.

Operations of the rental system having the above-described structure will now be explained.

When checking in a hotel, a guest presses a predetermined operational button included in the input section 61 of the management system 6. Upon pressing the operational button, the input section 61 outputs a checking-in-starting signal, for instructing the controller 68 to start a checking-in process, to the controller 68.

Figure 15:
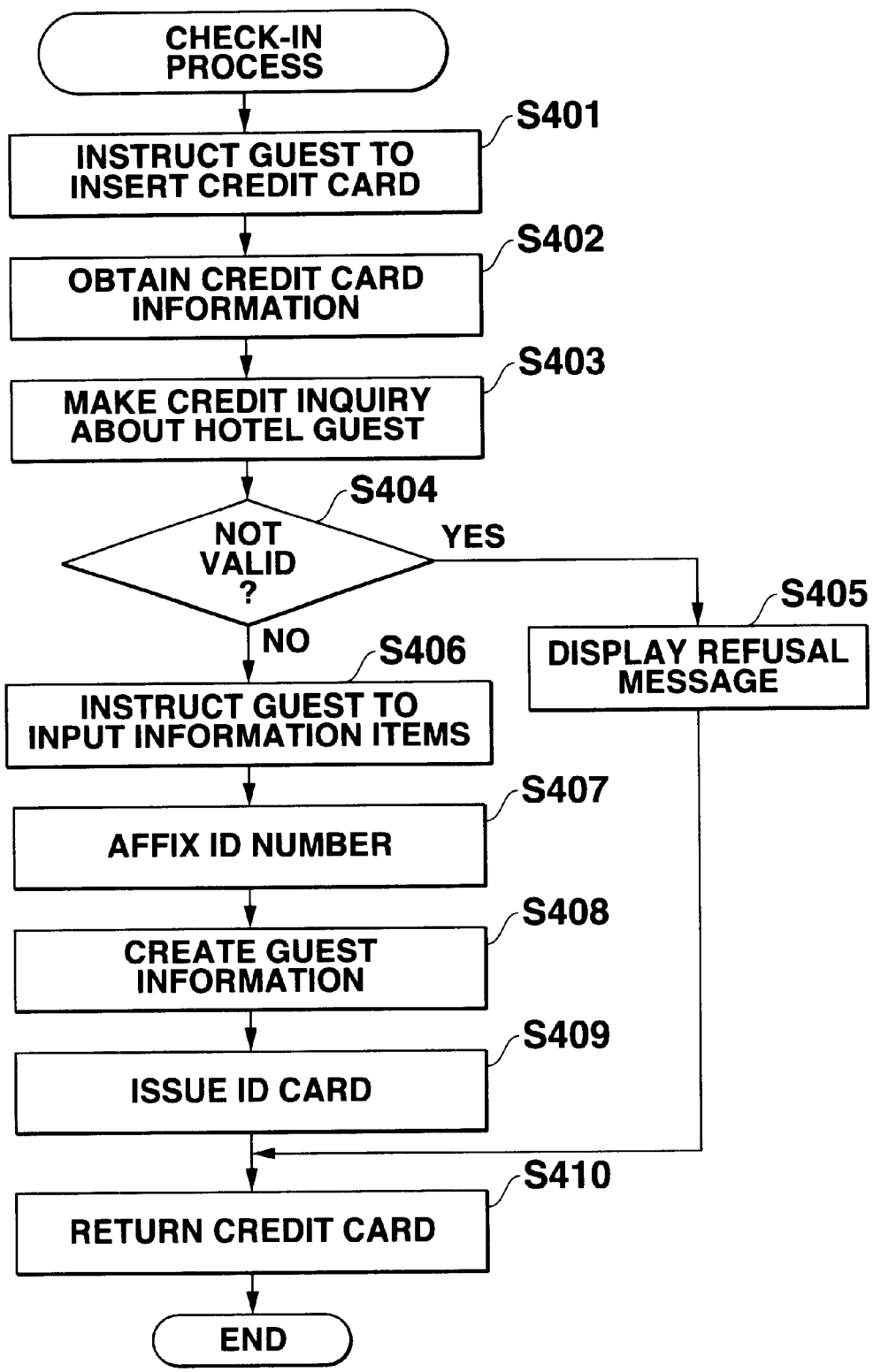
FIG. 15 is a flowchart for explaining a checking-in process, which is carried out by a controller included in the management system shown in FIG. 14.

In response to the checking-in-starting signal sent from the input section 61, the controller 68 begins the checking-in process shown in FIG. 15.

The controller 68 instructs the guest to insert his/her credit card (Step S401). Particularly, the controller 68 controls the display section 62 to display a message, like "Insert your credit card".

Upon insertion of the credit card in the card reader 64 in accordance with the message displayed on the display section 12, the controller 68 controls the card reader 64 to read out information (credit-card company, credit card number, and the like) which is recorded on the inserted credit card (Step S402).

The controller 68 controls the communications interface 67 to send the read credit card number, etc., to the inquiry center 5, thereby to make a credit inquiry about the guest (Step S403).

The inquiry center 5 makes a credit inquiry about the guest using the credit card number, etc. sent from the management system 6. When the guest is satisfactorily verified, the inquiry center 5 sends an inquiry result representing that the credit card number and such are valid, to the management system 6. On the contrary, when the guest is not satisfactorily verified the inquiry center 5 sends an inquiry result representing that the credit card number and such are not valid, to the management system 6.

The controller 68 of the management system 6 receives the inquiry result sent from the inquiry center 5 through the communications interface 67. The controller 68 determines whether the guest's credit card is valid, based on the received inquiry result (Step S404).

In the case where it is determined that the guest's credit card is not valid (Step S404; YES), the controller 68 controls the display section 62 to display a refusal message, like "We're sorry, your credit card is not valid" (Step S405), and executes the procedure of Step S410.

On the contrary, in the case where it is determined that the guest's credit card is valid (Step S404; NO), the controller 68 instructs the guest to input information items (such as residential address, name, age, sex, and phone number) necessary for checking in the hotel (Step S406). Particularly, the controller 68 controls the display section 62 to display a message, like "Input following information items", together with a predetermined input display.

If the guest inputs the requested information items through the input section 61, in accordance with the message on the display section 12, the controller 68 affixes an ID number of the guest (Step S407).

After this, the controller 68 creates the guest information, using the information regarding the guest's credit card, the input information items, and the affixed ID number, and stores the created guest information in the memory 66 (Step S408). Then, the guest is added into a guest list.

After this, the controller 68 controls the card issuer 63 to issue an ID card recording the ID number, which is affixed in the step S407 (Step S409).

The controller 68 controls the card reader 64, for returning the credit card to the guest (Step S410), and the checking-in process is completed.

The hotel guest who has checked in the hotel can get various services offered by the hotel, by using the ID card issued by the management system 6.

When to rent the digital camera 2, the guest presses a predetermined operational button included in the operational section 11 of the rental-item providing machine 1. Upon this, the operational section 11 outputs a rent-signal for instructing the controller 17 to start a process for providing the rental digital camera 2, to the controller 17.

Figure 16:
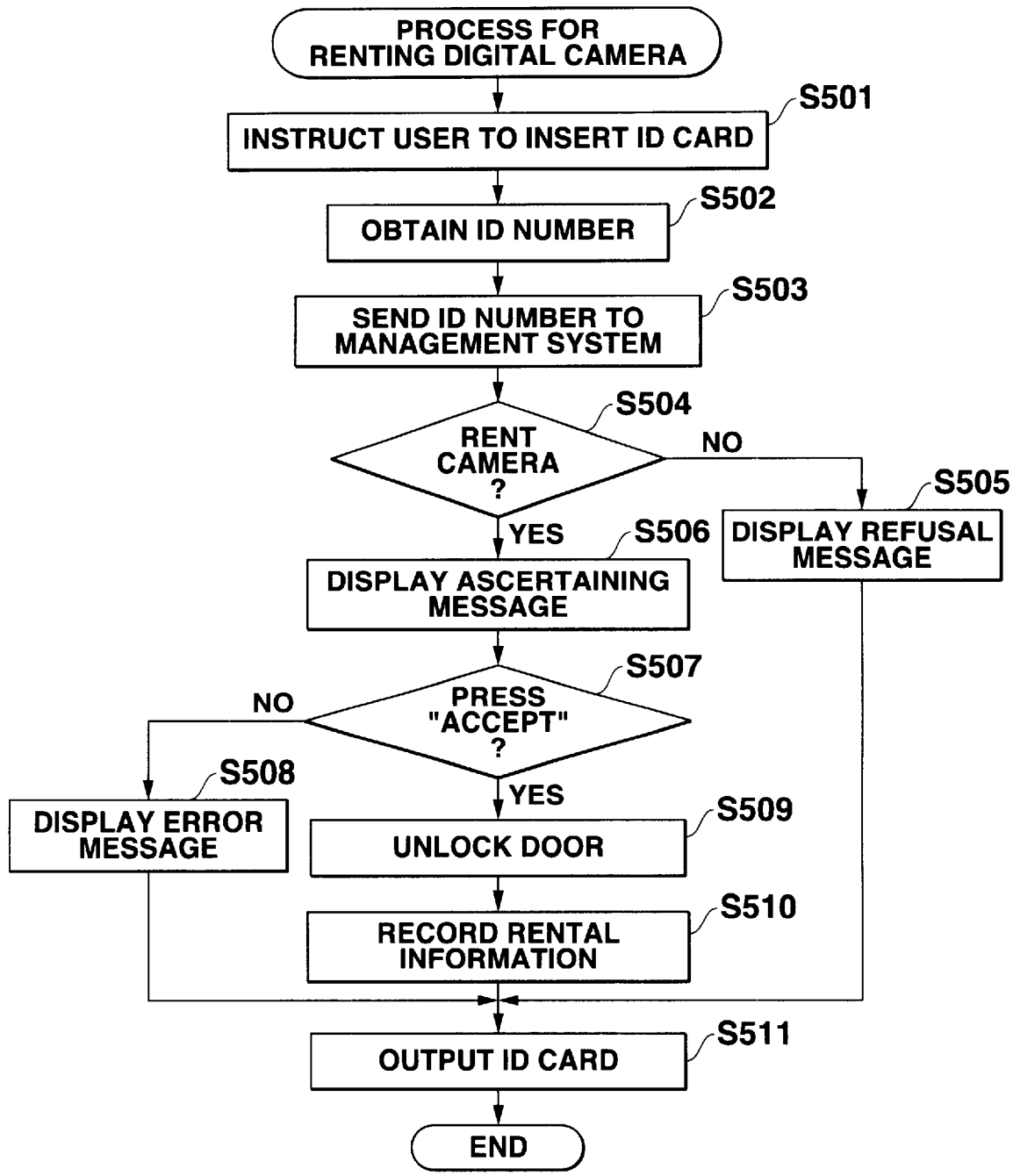
FIG. 16 is a flowchart for explaining a process for providing a rental digital camera, which is carried out by the controller of the rental-item providing machine included in the rental system of FIG. 14.

In response to the rent-signal sent from the operational section 11, the controller 17 begins the process for providing the rental digital camera 2, which is shown in FIG. 16, in accordance with the program and data stored in the memory 15.

Likewise the first embodiment, the controller 17 controls the display section 12 to display a predetermined message, so as to instruct the guest to insert the ID card (Step S501).

After the guest inserts the ID card into the card inserting section 13A in accordance with the displayed message, the controller 17 controls the card reader 13 to read out the ID number of the guest from the inserted card (Step S502).

The controller 17 stores the read ID number in the memory 15, controls the communications section 14, and sends the stored ID number to the management system 6, for making sure that the guest is actually staying at the hotel (Step S503).

The controller 68 of the management system 6 receives the ID number sent from the rental-item providing machine 1 through the communications interface 67. Then, the controller 68 searches for the guest information stored in the memory 66, and discriminates whether the guest corresponding to the sent ID number is actually staying at the hotel. The controller 68 sends the discrimination result to the rental-item providing machine 1 through the communications interface 67.

The controller 17 of the rental-item machine 1 receives the discrimination result sent from the management system 6 through the communications section 14. The controller 17 discriminates whether the guest is actually staying at the hotel, using the received discrimination result. Then, the controller 17 discriminates whether to rent the digital camera 2 to the guest (Step S504).

In the case where it is discriminated that the guest is not actually staying at the hotel, i.e. that the digital camera 2 is not to be rented to the guest (Step S504; NO), the controller 17 controls the display section 12 to display a refusal message, like "We're sorry. Your request can not be accepted." (Step S505), and executes the procedure of step S511, as will be explained later.

On the contrary, in the case where it is discriminated that the guest is actually 10 staying at the hotel, i.e. that the digital camera 2 is to be rented to the user (Step S504; YES), the controller 17 controls the display section 12 to show the terms of agreement to the guest. After this, the controller 17 controls the display section 12 to display an ascertaining message, likewise the first embodiment (Step S506).

In the process for providing the rental digital camera, those procedures including and following the step S507 are substantially the same as those including and following the step S107 of the process for providing the rental digital camera described in the first embodiment. Note that the controller 17 sends service-offering information including the ID number of the guest and the management number of the rented digital camera 2 in association with each other, to the management system 6, when the digital camera 2 is rented to the user. The controller 68 of the management system 6 stores the service-offering information sent from the rental-item providing machine 1, in the memory 66. The controller 68 stores what service has been offered to the guest, i.e. which one of the digital camera 2 has been rented to the guest.

The guest rents the digital camera 2 provided from the rental-item providing machine 1 in accordance with the above-described process for providing the rental digital camera, and can freely use the digital camera 2 within a predetermined area.

The image data captured by the digital camera 2 is sent to the rental-item providing machine 1 from the data transmission section 2E of the digital camera 2, likewise the second embodiment, and stored in the memory 15 of the rental-item providing machine 1.

When the user completes taking photographs using the rented digital camera 2, the user presses a predetermined operational button included in the digital camera 2, thereby a photography-completion signal is sent to the rental-item providing machine 1, likewise the second embodiment. Upon reception of this photography-completion signal, the rental-item providing machine 1 prints those images which are photographed by the guest before returning the digital camera 2.

After the photographing of the images, the guest intends to return the digital camera 2 so as to press a predetermined operational button included in the operational section 11 of the rental-item providing machine 1. The operational section 11 outputs a return-signal for instructing the controller 17 to begin a process for returning the digital camera 2, to the controller 17.

Figure 17:
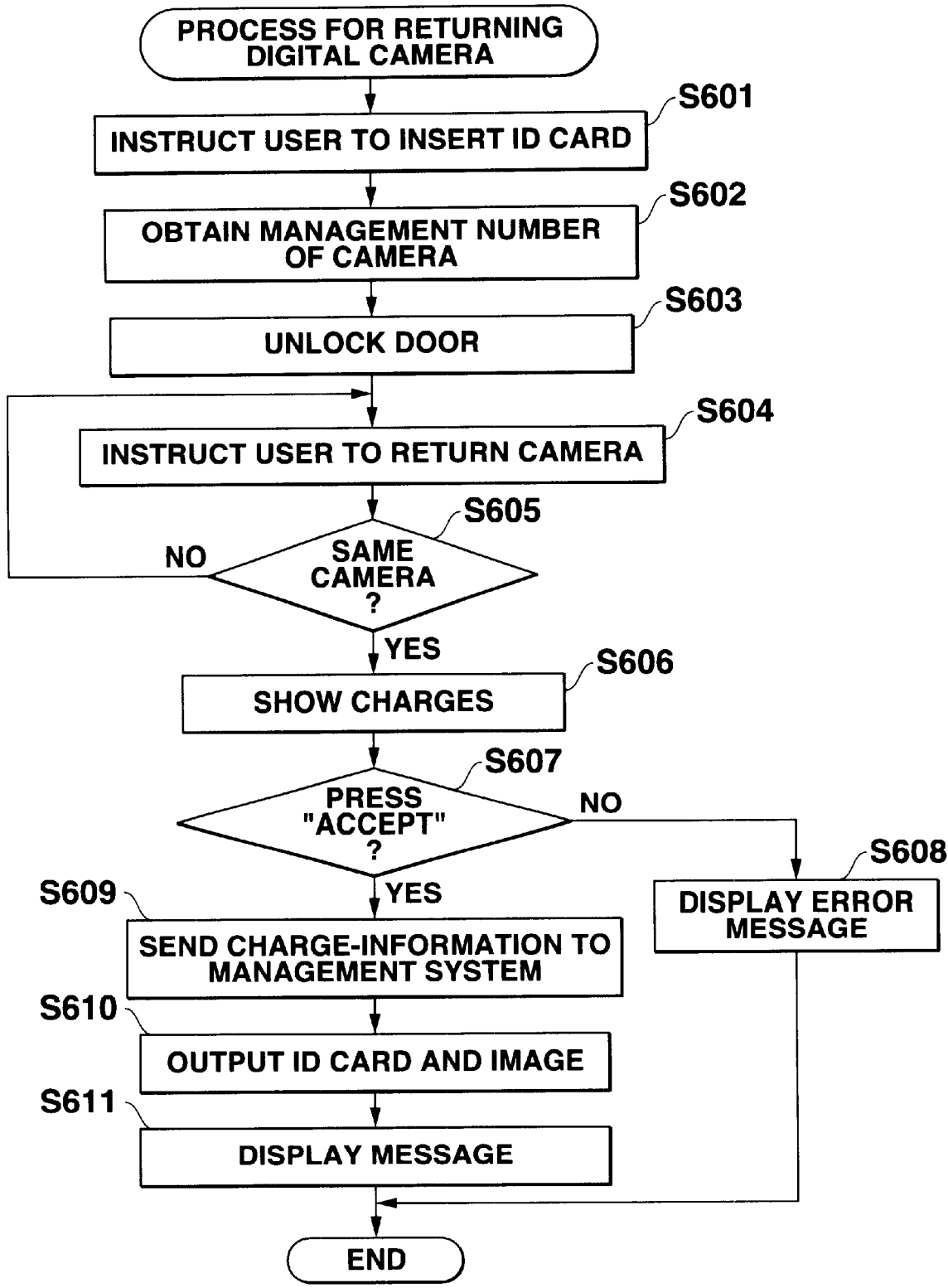
FIG. 17 is a flowchart for explaining a process for returning a digital camera, which is carried out by the controller of the rental-item providing machine included in the rental system shown in FIG. 14.

In response to the return-signal sent from the operational section 11, the controller 17 begins the process for returning the digital camera 2, which is shown in FIG. 17, in accordance with the program and data stored in the memory 15.

In the process for returning the digital camera 2, those procedures including and preceding step S607, for determining whether the user has accepted to pay the shown amount of money, are substantially the same as those including and preceding the step S307, for returning the digital camera 2, described in the second embodiment.

In a case where it is determined that the button "Accept" has not been pressed within a predetermined period of time in the step S607 (Step S607; NO), the controller 17 controls the display section 12 to display an error message, likewise in the second embodiment (Step S608), and the process for returning the digital camera is terminated.

On the contrary, in a case where it is determined that the button "Accept" has been pressed within a predetermined period of time (Step S607; YES), the controller 17 controls the communications section 14, and sends charged-information representing the amount of money (rental charges +printing charges) to be charged to the guest to the management system 6, together with the ID number of the guest (Step S609). The controller 68 of the management system 6 receives the charged-information sent from the rental-item providing machine 1 through the communications interface 67, and stores the received information in the memory 66.

After this, the controller 17 outputs the ID card from the card inserting section 13A, and outputs the printed images to the output section 16A (Step S610).

The controller 17 controls the display section 12 to display a message, like "Thank you for using our service. We wait for the next opportunity." (Step S611), and the process for returning the digital camera is completed.

Accordingly, unlike the first and second embodiments, in this embodiment, the user of the digital camera 2 need not pay the rental charges at the time of returning the digital camera 2 to the rental-item providing machine 1. Instead, the user is to pay the rental charges at the time of checking out of the hotel, as will specifically be described later.

The guest who intends to check out of the hotel presses a predetermined operational button included in the input section 61 of the management system 6. Upon this, the input section 61 outputs a checking-out starting signal for instructing the controller 68 to begin a checking-out process, to the controller 68.

Figure 18:
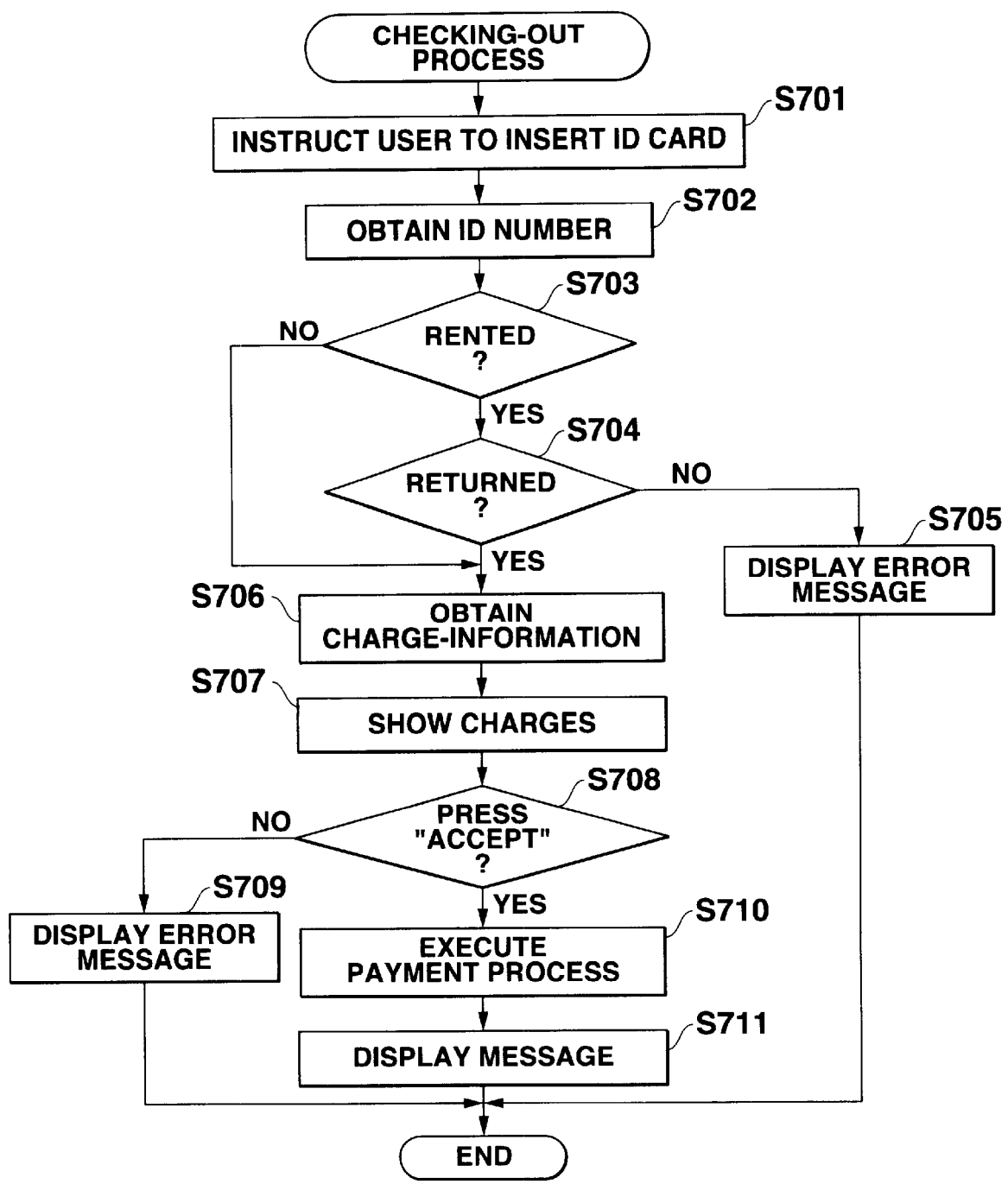
FIG. 18 is a flowchart for explaining a checking-out process which is carried out by the controller included in the management system shown in FIG. 14.

In response to this checking-out starting signal sent from the input section 61, the 20 controller 68 begins the checking-out process shown in FIG. 18.

The controller 68 instructs the user to insert the ID card (Step S701). Particularly, the controller 68 controls the display section 62 to display a message, like "Insert your ID card".

After the guest inserts the ID card in the card reader 64 of the management system 6, in accordance with the displayed message, the controller 68 controls the card reader 64 to read the ID number recorded on the ID card (Step S702).

Then, the controller 68 obtains service-offering information including the read ID number from the memory 66. The controller 68 ascertains the service(s) offered to the checking out guest. That is, the controller 68 discriminates whether the guest has rented the digital camera 2 (Step S703).

In a case where it is discriminated that the guest has not rented the digital camera 2 (Step S703; NO), the controller 68 executes the procedure of step S706.

On the contrary, in a case where it is discriminated that the guest has rented the digital camera 2 (Step S703; YES), the controller 68 discriminates whether the rented digital camera 2 has been returned (Step S704). For example, the controller 68 accesses the rental-item providing machine 1 through the communications interface 67, and discriminates whether the rented digital camera 2 has been returned.

In a case where it is discriminated that the rented digital camera 2 has not yet been returned (Step S704; NO), the controller 68 controls the display section 62 to display an error message, like "Please return digital camera" (Step S705), and the checking out process is terminated.

On the contrary, in a case where it is discriminated that the rented digital camera 2 has been returned (Step S704; YES), the controller 68 obtains the guest information and charged-information regarding the guest who is to check out of the hotel, from the memory 66 (Step S706).

The controller 68 calculates the hotel charges based on the guest information and service charges based on the charged-information. The controller 68 sums up the total amount of money to be charged to the guest, and controls the display section 62 to display the charged amount of money (Step S707).

After this, the controller 68 controls the display section 62 to display a message, like "If you accept, press the button 'Accept'". The controller 17 discriminates whether the guest has pressed a predetermined button ("Accept") included in the input section 61, thereby to determine whether the guest has accepted to pay the displayed amount of charged money (Step S708).

In the case where it is discriminated that the button "Accept" has not been pressed within a predetermined time period (Step S708; NO), the controller 68 controls the display section 62 to display an error message, like "Try again" (Step S709), and the checking out process is terminated.

On the contrary, in a case where it is discriminated that the button "Accept" has been pressed within a predetermined period of time (Step S708; YES), the controller 68 executes a payment process with a card, using the guest information regarding the guest stored in the memory 66 (Step S710). Note that the calculated amount of money is charged to the credit card company, and the hotel guest pays the charged money to the credit card company later on.

After this, the controller 68 controls the receipt printer 65, and issues a receipt corresponding to the above payment. The controller 68 controls the display section 12 to display a message, like "Thank you for using our service. We wait for the next opportunity" (Step S711), and the checking out process is completed.

As explained above, with the management system 6 of the hotel, the rental system for providing the rental digital camera 2 can easily be formed. Because the payment is done at the time of checking out, it would be easy for hotel guests to utilize such a rental system.

In the above-described embodiments, as a method for identifying the digital camera 2 put inside the box 18, the infrared-ray detector has been employed. However, any other methods can be employed for identifying the digital camera 2 thereinside. A bar-code reader may be used as the camera identifier 18C, and a bar-code may be affixed onto the digital camera 2. The digital camera 2 inside the box 18 and the controller 17 may be connected with each other through a cable, etc., and the controller 17 reads the management number stored in the buffer memory 2C of the digital camera 2 so as to identify the digital camera 2. Otherwise, using a short distance radio transmission technique, such as a Bluetooth technology, the controller 17 obtains the management number of the digital camera 2 so as to identify the digital camera 2.

The digital camera 18 inside the box 18 may be connected to the controller 17 through a cable, etc., and the controller 17 provides the returned digital camera 2 with a test signal or the like, thereby to check the fundamental functions of the digital camera 2.

Since the digital camera 2 is used within a predetermined area, the image data may be sent to the rental-item providing machine 1 from the digital camera 2 through a dedicated line installed in a predetermined area, instead of a public line.

In the first embodiment, the rental-item providing machine 1 may obtain the personal information of the user from the cellular phone 3 possessed by the user, without the use of the card. In such a case, the rental-item providing machine 1 may include the data reception section 19, like the one described in the second embodiment, and obtain the personal information of the user through the data reception section 19.

The rental-item providing machine 1 may obtain the registration number of the cellular phone 3 from the cellular phone 3 possessed by the user. Then, the rental-item providing machine 1 may get the rental charges for the rental digital camera 2, directly from an account of the user at a financial institution which the user uses for paying the service charges for the cellular phone 3, using the obtained registration number.

The image data may commonly be shared by the entire rental-item providing machine 1. In this structure, the user or guest may return the rental digital camera 2 to any one of the plurality of rental-item providing machines 1, and may get the printed image from any one of the plurality of machines 1. If the rental-item providing machines 1 are installed in a plurality of entrances of an event hole, such as a theme park, wedding hole, sample fair, and the like, the user can return the rental digital camera 2 to any one of the rental-item providing machines 1 at the plurality of entrances, and can get the printed image from any one of the machines 1.

Figure 19:
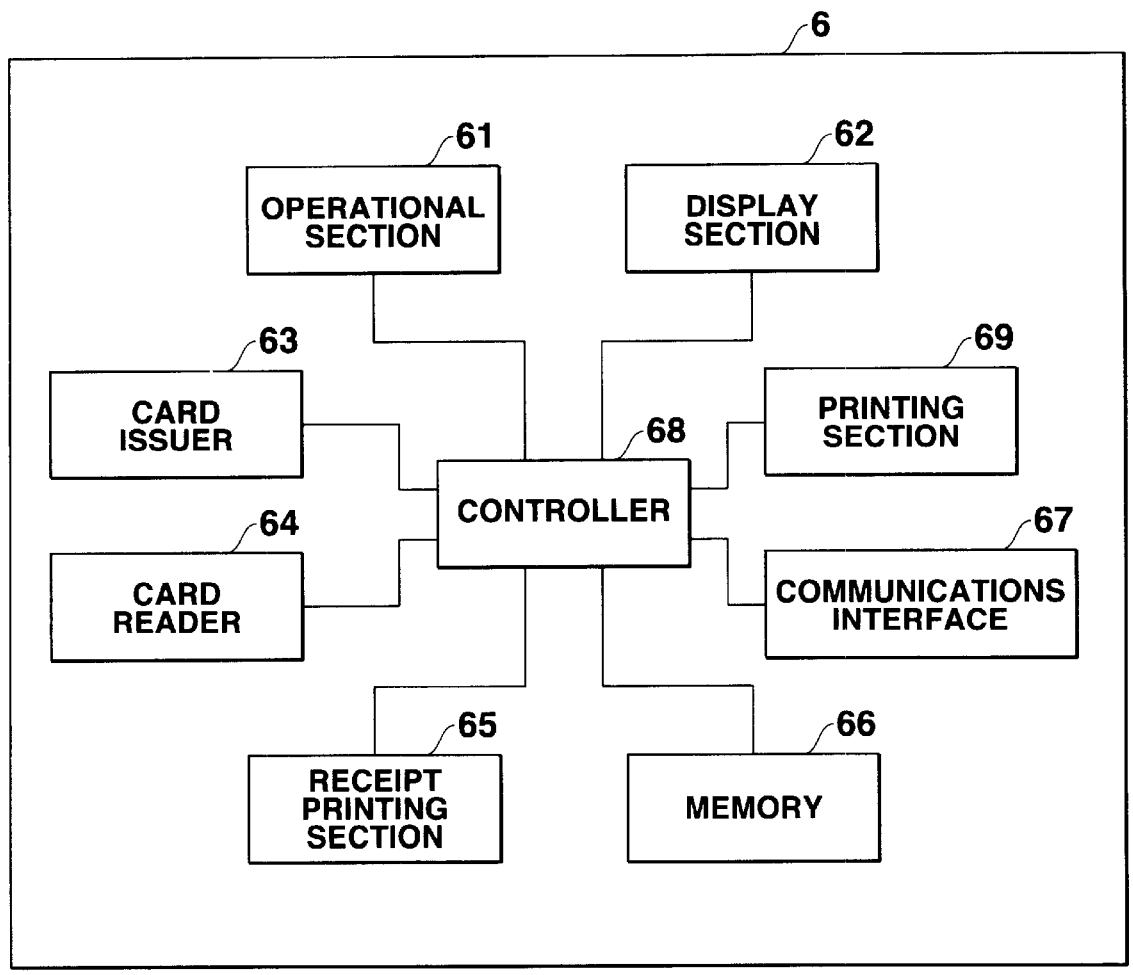
FIG. 19 is a diagram showing another structure of the management system.

In the third embodiment, as seen from FIG. 19, the management system 6 may include a printing section 69 which prints images. In this case, image data of images photographed by the guest is sent to the management system 6 from the digital camera 2. The controller 68 of the management system 6 receives the image data sent from the digital camera 2 through the communications interface 67, and stores the received image data in the memory 66 of the management system 6. The controller 68 may control the printing section 69 to print images using the image data stored in the memory 66, and give the printed images to the hotel guest at the time of checking out of the hotel.

The rental system may not include the rental-item providing machine 1. In this structure, a human operator may provide the user with the digital camera 2, and receive the returned digital camera 2 from the user by hand. For example, when the controller 68 of the management system 6 obtains an inquiry result representing that the hotel guest is valid, the controller 68 controls the display section 62 to display a predetermined message, thereby to instruct a person in charge at the front desk to rent the digital camera 2 to the hotel guest. Upon this, the person in charge at the front desk rents the digital camera 2 to the hotel guest. Afterwards, the person in charge inputs the management number of the returned digital camera 2 through the operational section 61. Then, the controller 68 can determined whether the rental digital camera 2 has been returned.

As described in the second and third embodiments, if the digital camera 2 uses the communications network of PHS, the present position of the digital camera 2 may be detected by the management center 4 or management system 6, in combination of the techniques of PHS and GPS (Global Positioning System). For example, in combination of PHS and GPS using the technique disclosed in Unexamined Japanese Patent Application KOKAI Publication No. H11-271416, the management center 4 or management system 6 may detect the present position of the digital camera 2. In this structure, if the use or guest gets out of a predetermined area, the management center 4 or management system 6 can warn the user or hotel guest through the digital camera 2.

If the present position of the digital camera 2 can thus be detected, the management center 4 or management system 6 can estimate that the user or hotel guest would return the rental digital camera 2 to a particular one of the plurality of rental-item providing machines 1. Specifically, in the case where the plurality of rental-item providing machines 1 are installed at intervals of, for example, 50 m, the management center 4 or management system 6 estimates that the user or hotel guest would return the digital camera 2 to a rental-item providing machine 1 which is installed 10 m away from the digital camera 2, for example. Further, the management center 4 or management system 6 may instruct the estimated rental-item providing machine 1 to get ready for the printing process, thereby the printing process can be accomplished with high efficiency.

It is not limited to hotels that can have the rental system of the third embodiment of 10 the present invention. For example, such a rental system can be realized in any institutions or facilities having membership information for identifying each member, such as a golf club, sports gym, etc.

In the case where the user possesses no card for identifying himself/herself, the rental-item providing machine 1 may temporarily receive deposit money from the user, for providing the rental digital camera 2, and return the deposit money to the user after the digital camera 2 returns back to the machine 1.

Not just printing the photographed images, the image data may be recorded on a recording medium, such as a CF (Compact Flash) card or FD (Floppy Disk) so as to provide to the user or hotel guest.

The structures of the rental systems described in the first to third embodiments may be combined. For example, the digital camera 2 described in the first embodiment may include a communications function such a function as the digital camera 2 described in the second embodiment.

In the rental systems according to the first to third embodiments, the item to be rented is not limited to the digital camera 2. For example, any other electronic units including video cameras, car-navigation systems, etc. and other items including sports-related items or tools, etc. can be provided as a rental item.

Various embodiments and changes may be made thereonto without departing from he broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-140141 filed on May 12, 2000, and including specification, claims, drawings and summary. The disclosure of the above Japanese Patent Application is incorporated herein by reference in its entirety.

What is claimed is:

1. A rental system comprising:
a rental-item providing machine which contains at least one rental item, and provides the at least one rental item to a user;
a management device which is connected to said rental-item providing machine through a communication line, and manages the at least one rental item using information supplied from said rental-item providing machine through said communication line; and
an inquiry center which makes a credit inquiry about a user;
wherein said rental-item providing machine includes:
a container which contains the at least one rental item;
an identification section which is installed in said container and identifies the at least one rental item contained inside said container;
a first transmitter which transmits identification information representing the at least one rental item identified by said identification section to said management device, through said communication line;
a first determiner which determines whether to rent the at least one rental item to the user based on a result of the credit inquiry made by said inquiry center;
an opener which provides the user with the at least one rental item by opening said container, in a case where said first determiner determines to rent the at least one rental item to the user;
a memory which stores rental information representing the at least one rental item rented to the user and user identification information in association with each other;
a second determiner which determines whether a returned rental item is the same as the at least one rental item rented to the user, based on the rental information stored in said memory; and
a requesting device which requests the user to return the at least one rental item rented by the user, in a case where said second determiner determines that the returned rental item is not the same as the at least one rental item rented to the user;
wherein said first determiner includes:
a card reader which reads out personal information of the user from a card possessed by the user; and
a second transmitter which sends the personal information read by said card reader to said inquiry center;
wherein said management device stores the identification information sent from said first transmitter through said communication line, to thereby manage the at least one rental item;
wherein said management device includes:
a position detector which detects a position of the at least one rental item rented to the user;
a third determiner which determines whether the at least one rental item is positioned outside a predetermined area, based on a detection result of said position detector; and
a warning transmitter which transmits a warning to the user to which the at least one rental item is rented, in a case where said third determiner determines that the at least one rental item is positioned outside the predetermined area.

2. A rental system comprising:
a rental-item providing machine which contains at least one digital camera as a rental item, and provides the at least one digital camera to a user;
a management device which is connected to said rental-item providing machine through a communication line, and manages the at least one digital camera using information supplied from said rental-item providing machine through said communication line;
an inquiry center which makes a credit inquiry about a user;
wherein said rental-item providing machine includes:
a container which contains the at least one digital camera;

an identification section which is installed in said container and identifies the at least one digital camera contained in said container;

a first transmitter which transmits identification information representing the at least one digital camera identified by said identification section to said management device, through said communication line;

a first determiner which determines whether to rent the at least one digital camera to the user based on a result of the credit inquiry made by said inquiry center;

an opener which provides the user with the at least one digital camera by opening said container, in a case where said first determiner determines to rent the at least one digital camera to the user;

a memory which stores rental information representing the at least one digital camera rented to the user and user identification information in association with each other;

a second determiner which determines whether a returned digital camera is the same as the at least one digital camera rented to the user, based on the information stored in said memory;

a requesting device which requests the user to return the at least one digital camera rented by the user, in a case where said second determiner determines that the returned digital camera is not the same as the at least one digital camera rented to the user;

a card reader which reads out personal information of the user from a card possessed by the user;

a second transmitter which sends the personal information read by said card reader to said inquiry center; and a printer which prints an image photographed by the digital camera;

wherein said management device stores the identification information sent from said first transmitter through said communication line, to thereby manage the at least one digital camera; and wherein said inquiry center makes the credit inquiry about the user using the personal information sent from said second transmitter.

3. The rental system according to claim 2, wherein:

the digital camera includes a third transmitter which sends image data representing the photographed image;

said rental-item providing machine includes a first receiver which receives the image data sent by said third transmitter; and said printer prints the image photographed by the digital camera, using the image data received by said first receiver.

4. The rental system according to claim 3, wherein:

the digital camera is connectable to a cellular phone; and said third transmitter transmits the image data through said cellular phone connected to the digital camera.

5. The rental system according to claim 4, wherein:

said rental-item providing machine includes a plurality of rental-item providing machines within a predetermined area, and said management device includes:
   a position detector which detects a position of the digital camera rented by the user,
   a fourth determiner which determines said rental-item providing machine to which the user returns the digital camera, based on a detection result of said position detector, and
   a controller which controls said rental-item providing machine determined by said fourth determiner to prepare for printing the image photographed by the digital camera.

6. A rental-item providing machine comprising:

a container which contains at least one digital camera as a rental item, said digital camera including a first transmitter which transmits image data of a photographed image;

a first determiner which determines whether to provide a user with the at least one digital camera, by making a credit inquiry about the user;

an opener which opens said container so as to provide the user with the at least one digital camera, in a case where said first determiner determines to provide the user with the at least one digital camera;

a memory which stores rental information representing the user and the digital camera rented to the user in association with each other;

a second determiner which determines, based on the rental information stored in said memory, whether a returned digital camera is same as the digital camera rented to the user;

a requester which requests the user to return the rented digital camera, in a case where said second determiner determines that the returned digital camera is not same as the digital camera rented to the user;

a receiver which receives the image data transmitted by said first transmitter; and a printer which prints the image photographed by the digital camera using the image data received by said receiver;

wherein said first determiner includes:
   a card reader which reads out personal information of the user from a card which is held by the user; and
   a second transmitter which transmits the personal information read out by said card reader to a predetermined credit inquiry center, to thereby make the credit inquiry about the user.

* * * * *